(12) United States Patent
Bolotin et al.

(10) Patent No.: US 12,222,858 B1
(45) Date of Patent: Feb. 11, 2025

(54) SYSTEM AND METHOD FOR OPTIMIZED COMPUTATION AND DATA MANAGEMENT WITH GARBAGE COLLECTION AND REDUNDANT PROCESSING MITIGATION IN GRAPH STATE CONFIGURATION

(71) Applicant: MiLaboratories Inc., San Francisco, CA (US)

(72) Inventors: Dmitriy Bolotin, Ramat Gan (IL); Stanislav Poslavsky, Bilbao (ES); Denis Korenevskii, San Francisco, CA (US); Gleb Zakharov, San Francisco, CA (US); Dmitriy Chudakov, Brno (CZ)

(73) Assignee: MiLaboratories Inc.

( * ) Notice: Subject to any disclaimer, the term of this patent is extended or adjusted under 35 U.S.C. 154(b) by 0 days.

(21) Appl. No.: 18/600,164

(22) Filed: Mar. 8, 2024

(51) Int. Cl.
*G06F 12/02* (2006.01)
*G06F 11/14* (2006.01)

(52) U.S. Cl.
CPC ...... *G06F 12/0253* (2013.01); *G06F 11/1458* (2013.01); *G06F 2212/702* (2013.01)

(58) Field of Classification Search
None
See application file for complete search history.

(56) References Cited

U.S. PATENT DOCUMENTS

| | | | | |
|---|---|---|---|---|
| 7,567,188 B1* | 7/2009 | Anglin | ................ | H03M 7/3084 341/63 |
| 10,976,965 B1 | 4/2021 | Houlemarde | | |
| 11,824,735 B1* | 11/2023 | Prateek | ............... | H04L 41/0806 |
| 2005/0257200 A1* | 11/2005 | Taylor | ..................... | G06F 30/34 717/136 |
| 2006/0210085 A1* | 9/2006 | Ho | .......................... | H04L 9/083 348/E7.063 |
| 2015/0078372 A1* | 3/2015 | Mani | ................... | H04M 1/2535 370/352 |
| 2015/0234935 A1 | 8/2015 | Gu et al. | | |
| 2017/0337138 A1 | 11/2017 | Li et al. | | |
| 2017/0364534 A1* | 12/2017 | Zhang | .................. | G06F 16/284 |

(Continued)

FOREIGN PATENT DOCUMENTS

EP 4064609 A 9/2022

*Primary Examiner* — Meng Ai T An
*Assistant Examiner* — Zujia Xu
(74) *Attorney, Agent, or Firm* — AEON Law, PLLC; Adam L. K. Philipp; Jonathan E. Olson

(57) ABSTRACT

Disclosed here are systems and methods for optimized computation and data management. The systems and methods can be implemented, for example, in a Directed Acyclic Graph (DAG). The disclosed methods and systems involve receiving user instructions to create a graph configured to represent computations and data as a plurality of resources. Cache rules are set in accordance with the user instructions for cached resources to prevent the cached resources from being removed by a garbage collector. The disclosed methods and systems may also involve performing dynamic garbage collection of one or more un-cached resources in response to detection that the one or more un-cached resources are not referenced by any other resource or that all caching periods are over. Iterated computations and data are identified, and recovery policies and deduplication policies are determined for the iterated computations and data.

18 Claims, 13 Drawing Sheets

(56) References Cited

U.S. PATENT DOCUMENTS

| | | |
|---|---|---|
| 2018/0067865 A1* | 3/2018 | Ahr ........................ G06F 9/5016 |
| 2018/0205618 A1* | 7/2018 | Weiner ................. H04L 41/5012 |
| 2018/0246988 A1 | 8/2018 | Johnson et al. |
| 2018/0300425 A1 | 10/2018 | Azmi |
| 2019/0097904 A1* | 3/2019 | Park ....................... H04L 43/045 |
| 2019/0278261 A1* | 9/2019 | Shibuya .............. G05B 23/0283 |
| 2019/0312772 A1* | 10/2019 | Zhao ...................... G06F 9/5011 |
| 2020/0050586 A1* | 2/2020 | Pal ........................ G06F 16/148 |
| 2020/0311076 A1 | 10/2020 | Lee et al. |
| 2021/0232579 A1* | 7/2021 | Schechter ............. G06F 16/254 |
| 2022/0006706 A1 | 1/2022 | Patodia et al. |
| 2022/0060568 A1* | 2/2022 | Tan ......................... H04L 67/01 |
| 2023/0176928 A1* | 6/2023 | John ...................... G06F 9/5072 |
| | | 712/220 |

* cited by examiner

SYSTEM AND METHOD FOR OPTIMIZED COMPUTATION AND DATA MANAGEMENT WITH GARBAGE COLLECTION AND REDUNDANT PROCESSING MITIGATION IN GRAPH STATE CONFIGURATION

FIELD

The present disclosure relates to systems and methods for optimized computation and data management.

BACKGROUND

Computation and data management is a core aspect of many fields where large volumes of data and/or heavy computations may be involved. Many fields of computation involve the application of various computational methods to analyze and interpret large datasets. In such fields as bioinformatics, machine learning, and others, large datasets are often involved.

Typically, data processing in fields such as bioinformatics and machine learning, among others, involves multiple stages, each of which may depend on the results of previous stages. These stages can be represented as operations in a Direct Acyclic Graph (DAG), where each node represents an operation, and the edges represent dependencies between operations. Each operation may produce and consume large amounts of data, sometimes up to terabytes.

One of the challenges in managing heavy computation is optimizing computation for efficient resource utilization. This involves determining the order of operations, managing dependencies between operations, and efficiently using storage space. However, managing these operations and their dependencies can be a complex task. In many cases, computations are performed in parallel, and the results of these computations are used as inputs for subsequent operations. The management of these computations and the data they produce is a complex task that requires careful planning and execution.

In research and other data- or computation-intensive projects, the same computations with the same data tend to reappear. The following cases illustrate typical situations where it happens:

1) Different computational experiments on the same data. The high costs of data generation and high information content of datasets such as in bioinformatics make it practical to reuse datasets generated in a single project in multiple other related research endeavors. Reproducible research practices imply that each separate project starts from the initial raw datasets to control all the analysis steps and ensure the absence of computationally introduced biases and batch effects. This leads to repeated execution of equivalent computational workloads, and subsequent storage of equivalent intermediate and final data files.

2) Iterative data analysis. In any given project, work on the analysis pipeline creation and optimization leads to the accumulation of multiple coexisting pipeline variations.

3) Generation of reference data. Many projects, such as those in bioinformatics, require the generation of different kinds of reference datasets. The examples for bioinformatics include (i) genomic, transcriptomic, and other types of reference indices, (ii) control datasets from public or private data pools analyzed in parallel with the target data, etc.

4) Addition of new data to existing projects. Normally, as the project continues, new datasets are generated because of planned experiments and generated in response to initial analysis results. The addition of these datasets to the existing analysis pipeline again implies data reanalysis to incorporate the new information in a homogeneous manner.

Therefore, there is a continuous demand for efficient and effective methods and systems for optimized computation and data management.

Partial Summary of the Invention

Systems and methods as described herein relate to optimized computation and data management, for example in biological data processing. These systems, methods, and techniques allow for the processing of complex and large volumes of data in a more efficient and optimized manner, for example in bioinformatics, machine learning, and other fields.

In general, in a first aspect, disclosed herein features a computer-implemented method for optimized computation and data management. This method involves receiving instructions to create a graph configured to represent computations and data as a plurality of resources. Cache rules may be set in accordance with the instructions for cached resources to prevent the cached resources from being removed by a garbage collector. This method also may involve performing dynamic garbage collection of one or more resources not referenced by any other resource. Iterated computations and data are identified, and recovery policies and deduplication policies are determined for the iterated computations and data.

Embodiments of the computer-implemented method may include one or more of the following features. The method may further involve detecting computations in a second run/instance that are executed in a first run/instance and data that are present in the first instance. The detected computations and data can be provided to the second run/instance without triggering execution of earlier operations in the second run/instance.

In another aspect, the disclosed methods may be implemented by a system having a plurality of computing devices. Each computing device respectively has one or more processors and a memory and the memory storing instructions that upon execution on or across the one or more processors cause the plurality of computing devices to implement the disclosed method.

Such systems may also recover computations and data that are rooted in the graph and identify and recover intermediate computations and data that are.

According to some embodiments, such systems may detect one or more operations in a later instance that produce same result as corresponding one or more operations in an earlier instance, mark the one or more operations in the later instance as a duplicate, apply the corresponding one or more operations in the earlier instance to the later instance, and terminate the earlier instance.

In another aspect, such systems may include a user interface configured to translate user inputs into a graph state and translate the graph state into visual feedback to a user.

In yet another aspect, such system may include a client device configured to load data that initializes a graph state.

In yet another aspect, such system may include one or more controller devices configured to perform a list of operations in accordance with the recovering policies and deduplication policies.

The foregoing summary is illustrative only and is not intended to be in any way limiting. Features from any of the disclosed embodiments can be used in combination with one another, without limitation. In addition to the illustrative aspects, embodiments, and features described above, further aspects, embodiments, and features will become apparent by reference to the drawings and the following detailed description.

DETAILED DESCRIPTION

Figure 1:
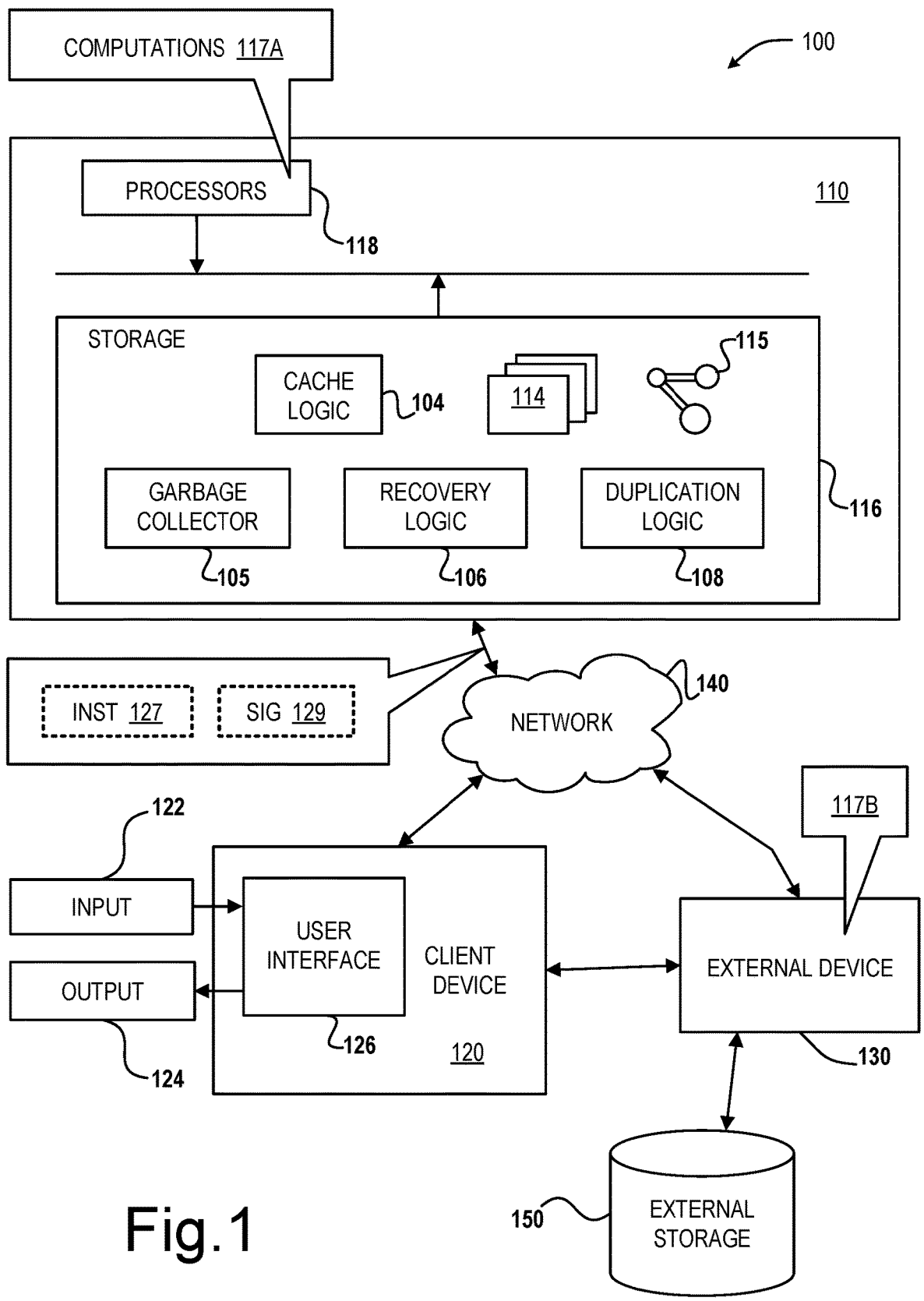
FIG. 1 is a block diagram illustrating an example of a platform system supporting the embodiments of the present disclosure, and other devices and a network incorporated with teachings of the present disclosure, according to some embodiments.

The present disclosure relates to systems and methods allowing to optimize computation and data management. In some implementations, the systems and methods may be designed to optimize computation and data management representing them as a graph. This process may begin with the systems receiving a request to create a graph that represents computations and data and to obtain the results of these computations. The request may be input through a user interface, which communicates with a data management computer.

The disclosed systems and methods may be beneficial in fields such as bioinformatics and machine learning, among others, where the processing of vast datasets is a common and challenging task. Fields such as bioinformatics involve the application of computational methods to the analysis and interpretation of data, which may include biological and other types of data. The processing of such data in some cases involves multiple stages, each of which may depend on the results of previous stages. These stages may be represented as operations in a Direct Acyclic Graph (DAG), where each node represents an operation, and the edges represent dependencies between operations. Each operation may produce and consume large amounts of data, sometimes up to terabytes.

The operations involved in data processing can be resource-intensive, requiring substantial amounts of input/output (IO), memory, and Central Processing Unit (CPU) time. Some operations may require extensive data analysis, such as building an in-memory index, which can be time-consuming. Furthermore, these operations are in many cases reproducible, meaning that they produce the same results when executed with the same parameters. When executed with the same parameters, such operations either produces byte-by-byte equivalent results, it can result in logically equivalent units such as files containing dates and other information not essential for their interpretation. Similar property can be attributed to the instantiation of a long running process, like a service program started with the same parameters in some external system like Kubernetes or HPC environment, and equivalently responding to same requests.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "after," "among," "any," "applied," "according to," "associated," "at least," "automatic," "available," "based on," "by virtue of," "caused," "collected," "compared," "comprising," "conditional," "configured," "confirmed," "contemporaneous," "corresponding," "digital," "directly," "distilled," "dynamic," "effective," "efficient," "event-sequencing," "executable," "existing," "filtered," "first," "for," "generated," "identified," "immediately," "implemented," "implied," "in lieu of," "indicating," "invoked," "simplified," "local," "mitigated," "more," "needed," "obtained," "optimized," "partly," "paused," "performed," "pre-assigned," "prevented," "present," "primary," "prior," "published," "ready," "recovered," "removed," "redundant," "referenced," "relating to," "represented," "responsive," "second," "shown," "since," "single," "skipped," "stateful," "suitable," "suspended," "suspicious," "through," "transistor-based," "triggered," "unable," "undefined," "updated," "upon," "via," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than two dozen. "Immediate" as used herein refers to having a duration of less than 5 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. "Instances" of an item may or may not be identical or similar to each other, as used herein.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Overview of the Graph State Management System

Some systems and methods disclosed herein address these challenges by managing a computation pipeline state represented by a computation graph. In one aspect, disclosed herein is a system configured to receive instructions to configure a graph that is configured to represent computations and data as a plurality of nodes. The nodes can be subject to a set of lifecycle rules automatically applied by the system. The lifecycle rules dictate the graph state transitions. These rules help computations to be executed in a logical and orderly manner, contributing to the overall processing efficiency.

The state managed by such systems can be used to determine a set of computations that can be scheduled to progress the execution of the computation pipeline. Completion of the scheduled computation can be translated into changes applied to the graph state. Said graph state changes lead to a certain set of lifecycle rules to be applied by the system. This, in turn, causes new computations to become schedulable, allowing further progression of the computation pipeline.

The graph state managed by the system can be used to determine a set of data operations on the datasets produced and consumed by said computations to efficiently progress the computation pipeline execution. Data operations may include but not limited to transferring the datasets between different storages, allocation of storage space and datasets removal.

Part of the lifecycle rules are designed to achieve deduplication. Deduplication is a feature that identifies and eliminates duplicate nodes for example representing computations within graph states managed by the system. When a graph is configured or updated, such system checks if the same computation node or a subgraph exists in the system. If a duplicate computation is detected, the system avoids redundant computations by marking said computation nodes or a subgraph as duplicate. This not only saves computational resources but also speeds up the overall processing time, eliminating the need to wait for the same computations to be completed multiple times.

Part of the lifecycle rules are designed to achieve result recovery. Result recovery is another feature of the system that enhances its efficiency. This feature allows the system to recover the results of previous computations when part of the computation graph is repeated. When a computation graph is configured or updated, the system checks if the same computation has already been performed earlier. If the results of said previous computations, represented by data nodes, are still registered in the system, the system identifies and recovers said results in the new instance of computation graph, preventing redundant computations to be scheduled. This feature is particularly useful in iterative analysis scenarios, where the same computation graph or subgraph may be configured multiple times with slightly different parameters and inputs.

Part of the lifecycle rules are designed to achieve smart garbage collection. Smart garbage collection is a feature that keeps only nodes that are referenced by other nodes, this for example allows to efficiently manage storage space or cancel computations that are not anymore required given the updated user requests. When a computation is completed and its results are no longer supported by any other node in the system, the system can mark results for removal to free up consumed resources, including, but not limited to removal of file from storage, shutdown of server or container instance in cloud. This feature is particularly useful in scenarios where the system handles large amounts of data or requires high expensive computation instance allocated in cloud, as it ensures that storage space is not wasted on unnecessary data and computation instance gets freed after computation completion. This allows for efficient and flexible management of resources and operations, that is adjusted to the specific task, leading to improved performance and reduced resource consumption.

The garbage collection feature and deduplication, combined with dynamic nature of computation graph state, provides the ability of smart and effective real-time cancellation of running calculations, that are no longer represented by existing computation nodes in the computation graph. This behavior allows to simply configure new version of computation graph and remove the old one, leaving the system to decide, what of already running calculations are needed as they are also present in the new instance of graph, and what calculations should be interrupted because they are no longer required according to the new instance of graph state.

The system in some embodiments may implement a cache management that allow to temporarily keep nodes from being removed from such system. The cached nodes are protected from garbage collection for a specified period of time, ensuring that they are available for reuse even not being referenced by any other node in a graph. This feature not only reduces the computational load but also speeds up the processing time, eliminating the need to re-run computations for results that are already available in the cache.

The overall set of node lifecycle rules is designed in such a way that the state of any node can change only in one direction. This one-way state transition principle serves as a foundation for most of the important behaviors implemented in described systems (i.e. deduplication, recovery, and caching). State transitions may be atomic in the sense that external observers may see a node only in one of a well-defined stable state. System in some embodiment may be implemented in such a way that node state is influenced only by the states of its direct references, so that information on state transition flows only between directly connected nodes. Thanks to the restrictions and rules described above, graph states under such systems management is guaranteed to reach a final stable state, that will not produce any new changes by itself until influenced by an external system or user.

Systems in one or more embodiments may provide an interface for communication with external units (clients), thus delegating implementation of operations and calculations, that are represented by the nodes in the computation graph and transitions between graph states. Clients can read existing graph state, modify existing graph state, or create new computation graphs or subgraphs. Any changes, made by clients to such system, may be grouped into atomic operations (transactions). The transactions may include, but are not limited to, creating a node, creating a reference between two nodes, and propagating a data node. The transactions guarantees that either all changes are received and will be applied by such system, or all are discarded. This ensures the integrity of such system state and prevents inconsistencies that could arise from the partial execution of a transaction.

The said interface may allow for real time monitoring of the graph state via notifications. Clients can connect to such system and receive messages about changes in nodes, providing faster reaction on said changes. Each client can inform such system, that some specific events require reaction from the client and the process of node state change propagation should be paused until the client explicitly informs such system it can continue the graph update. This is particularly useful for situations, when client wants to react on specific node removal and requires node information after getting a remove notification from such system to reflect this change onto the said external system.

It is possible to implement the bridging logic between the graph state and external systems, using the features described above. Some clients may be designed for the specific purpose of decoupling the implementation details of "how" particular operations are performed from "what" operations should be performed, as described by the graph state. Such a client is referred to as a Controller herein. The Controller may maintain its state within such system by utilizing existing graph nodes or by creating new nodes as needed.

Controller may be responsible for projection of graph node state onto one or more external systems, performing operations in response to the graph state changes, like:
  scheduling computations in external systems (including but not limited to local machine, cloud, HPC cluster, external API) in response to detection of ready computation nodes in the graph;
  managing files on various storage systems in response to the data nodes state change;
  managing services in remote computation cluster (including, but not limited to Kubernetes, AWS EC2, Slurm).
The overall set of possible controller functions is not limited to the list described in this paragraph. By changing a controller that manages particular graph nodes it is possible to map the same node types to different infrastructure-specific services thus creating an additional abstraction layer simplifying system deployment in different environments.

Systems in one or more embodiments may include a user interface. Such user interface serves as a bridge between a user and such systems, translating user inputs into a graph state and translating the graph state into feedback to a user. The user interface may be a client device configured to load data that initializes a graph state.

Systems in one or more embodiments may use a persistent storage to keep graph state and perform graph state transitions in a way that ensures consistency and reliability. Each state transition can be persisted along with all additional information, so such system can be reliably restored after any interruption.

FIG. 1 is a block diagram illustrating an example of a described system 100 supporting the embodiments of the present disclosure, and other devices and a network incorporated with teachings of the present disclosure, according to some embodiments. As illustrated in FIG. 1, data management computer 110 may be connected with client device 120 and external device 130 through network 140. Network 140 may be a cloud computing environment comprising cloud computing nodes that may be used by local computing devices. Data management computer 110 may be connected to one or more clients and/or one or more external devices. Data management computer 110 may be connected with external storage 150.

The components of data management computer 110 may include, but are not limited to, storage 116, one or more processors or processing units 118 implementing computations 117A, and system circuitrythat couples various components. Data management computer 110 may include a set of program modules 114 that may be stored in storage 116. One or more program modules 114 may include an operating system and one or more application programs. Program modules 114 carry out the embodiments of the present disclosure and other devices and a network.

Data management computer 110 includes garbage collector 105 to manage storage space in one or more such systems 100. Cache logic 104 may be configured for managing cache rules. Data management computer 110 includes cache logic 104 that allows such system to temporarily (or until cache periods are over) store the results of computations 117A-B for future use. The cached results are protected from garbage collection for a specified period of time. Data management computer 110 includes recovery logic 106 to recover the results of previous computations 117 when part of the computational pipeline is repeated. Data management computer 110 includes deduplication logic that can identify and eliminate duplicate computations 117 within such system. Data management computer 110 receives a user request from client device 120 to create a graph 115 (e.g. in a database 114) that represents computations 117 and data and to obtain the results of these computations 117. In some embodiments, graph 115 may be a subgraph or a DAG (or both).

Storage 116 may generally comprise random-access memory ("RAM"), read-only memory ("ROM"), and a permanent mass storage device, such as a disk drive or SDRAM (synchronous dynamic random-access memory). Data management computer 110 may store program code for modules and/or software routines. Storage 116 may store one or more processes (i.e., executing software application(s)) or an operating system. These software components may be loaded from a non-transient computer-readable storage medium into storage 116 using a drive mechanism associated with a non-transient computer-readable storage medium, such as a floppy disc, tape, DVD/CD-ROM drive, memory card, or other like a storage medium. In some embodiments, software components may also or instead be loaded via a mechanism other than a drive mechanism and computer-readable storage medium (e.g., via a network 140).

Processors 118 may include one or more execution cores (CPUs). For example, data management computer 110 may also include a peripheral controller hub (PCH) (not shown). Processors 118 may implement functionality and/or execute instructions 127 within data management computer 110. For example, processors 118 may act upon instructions 127 and other signals 129 stored by storage 116 that provide the functionality of data management computer 110. The instructions 127 executed by processors 118 may cause data management computer 110 to store and/or modify information within storage 116 during program execution, for example.

FIG. 1 illustrates only one particular example of platform system 100, and many other examples of such systems 100 may be used in other instances and may include a subset of the components included in platform system 100. Platform system 100 may likewise include additional components not shown in FIG. 1.

Implementation Aspects

The following description provides an example implementation of a graph state management system allowing to build a system exhibiting described behaviors. The following description uses the term "resource" to describe a special case of a graph node in a specifically designed graph representation framework. Each resource has a resource type (e.g., a string, file, computation or alike), data associated with a resource (e.g., a sequence of bytes, which may be empty), and might have one or more resource fields. It is important to note that the resource type and data associated with a resource can only be set at resource creation. Resource fields can be set after resource creation. However, possible transitions follow the rules of such system, and some fields can only be assigned once, some fields can only reference resources and fields of a certain type, etc. Each field may reference another resource, another field, or special resource that may represent an error. The following field types may be present in such system: input field, service input field, output field, one-time writable field, and dynamic field.

Resources (nodes) may represent an external entity such as a file, a running virtual machine and other resources allocated in the cloud environment or any other external service; a piece of information, such as string, scalar value, small binary data, anything that can be serialized into a small number bytes (i.e., <1 Mb); a structured set of other resources; computation (both the running process and the intention to perform the computation during the time when upstream processes are not yet finished and required datasets are not yet provided); a result of computation; a running service serving external or internal requests, or dynamically processing a data stream; and other things.

Two kinds of resources can be described in such system. One kind is root resources that exist in such system. Once created, they can only be removed once explicitly deleted. Another kind is a normal resource. Once created, such resource exists as long as any other resource references it or one of it's fields. Once the resource is not referenced by any other resource, and all caching periods are over, it is eventually deleted by such system. This is an example of "garbage collection."

Referring to FIG. 1, platform system 100, in the context of computational task management, is a system or environment that manages the state required for execution of tasks in an orderly manner. Platform system 100 can implement a complex set of rules describing how changes made to the resources are propagated through the graph (e.g., DAG), how those state changes affect the resource lifecycle, and what information is stored after the resource ceases to exist. Platform system 100 may connect all data processing steps into a single interconnected graph of calculations. The next stages of calculations are automatically released for execution as the results of the previous ones are ready, resulting in guaranteed progression to a final results. Platform system 100 can find a ready-made result using input parameters if they still exist in the system. Thus, there is no need to waste time on recalculation.

Some variants are described herein that ensure efficient and accurate handling of data. These systems may utilize identifiers to distinguish between different resources, to manage the relationships between them and to find two resources matching within some criteria. These identifiers may be assigned to resources upon their creation and are used to track and manage these resources throughout their lifecycle. These identifiers may serve distinct purposes and contribute to the optimized computation and data management of the system.

Such variants may use numerous Resource Identifiers (RIDs), distinct identifiers each assigned to a resource when it is created. Many of these identifiers are unrelated to the content of the resource, serving primarily as a means of uniquely identifying a resource when it is created within such system.

Such variants may likewise use Resource Canonical IDs (RCIDs). Such identifiers may each reflect the content of its resource in a broad sense. If the contents of two resources are the same, they may be assigned the same RCID. Once calculated for a resource, in some variants the RCID is immutable and cannot change.

Resource Topological ID (RTID) is another identifier that reflects the place of the resource in a DAG, taking into account the subgraph upstream of the resource in question. Two resources with the same set of upstream resources, connected in the same way, may (optionally) be assigned the same RTID by such system.

Alternative ID (AID) is a specific identifier of the output field, that uniquely identifies the specific output of the specific resource. The output fields with the same name of resources with the same RCID will have the same AID. Like RCID, AID is immutable and cannot change once calculated for the field.

These identifiers can be used in conjunction with data structures such as a Glossary and a CID index. A Glossary is used to map the AID of an output field to the RCID of its value. A CID index maps the RCID to the RID, enabling the identification of resources by their RCIDs.

In such system for data management, each resource is associated with a ResourceType (RType) and ResourceData (RData). RType is a string or binary data that is associated with a specific operation or item in such system. For instance, for the operation of adding two numbers, the resource type might be "AddTwoNumbers". For a file stored on storage, the resource type might be "File". This association of the RType with a specific operation or item provides a means of categorizing resources within such system, thereby facilitating efficient resource management and data handling.

On the other hand, RData is the data associated with the specific resource. The data is immutable and is set for the resource at the moment of resource creation. For example, for a resource that represents a file on storage device, the data may contain an absolute path to the file. This association of the RData with the specific resource provides a means of identifying and managing resources based on their associated data. The immutability of the RData ensures that the data associated with a resource remains consistent and reliable throughout the lifecycle of the resource, even if other aspects of the resource change.

In some cases, RType and RData are assigned to the resource after its creation. This assignment process ensures that each resource is immediately identifiable within such system based on its RType and RData, facilitating efficient resource management and data handling. In other cases, the RType and RData are assigned to the resource based on the specific operation or item associated with the resource. This assignment process ensures that the RType and RData accurately reflect the operation or item associated with the resource, providing a reliable and consistent means of identifying and managing resources within such system.

In such system for graph state management, each resource is associated with a set of ResourceFields. The ResourceField is a special item that is strongly associated with the resource it belongs to. It can refer to other fields or resources and is uniquely identified by a combination of ResourceID and field name (FName). Each field has a type, which can be "Input" (InF), "Output" (OutF), or "Dynamic."

In some cases, the ResourceField is of type "Input." This type of field is one-time writable, meaning that once the field is set to reference other field or resource, there is no way to change this reference. This characteristic of the "Input" type ResourceField ensures that the reference remains consistent and reliable throughout the lifecycle of the resource, even if other aspects of the resource change.

In other cases, the ResourceField is of type "Output". This type of field is also one-time writable. Each "Output" type field has several properties associated with it, including a Field CID (FCID), a Field TID (FTID), and a Field AID (FAID). The FCID is the Canonical ID of the resource the field refers to, or inherited from the other field it refers to. The value of this property may also be recovered from the Glossary. The FTID is the Topological ID, for input fields inherited from the field or resource the field refers to, for output fields calculated from the parent RTID. FAID is the Alternative ID of the field relevant for output fields and derived from the parent resource CID. These properties of the "Output" type ResourceField provide a means of identifying and managing resources based on their associated fields.

In yet other cases, the ResourceField is of type "Dynamic." This type of field is not one-time writable and can change over time. This characteristic of the "Dynamic" type ResourceField provides a means of tracking and managing the lifecycle of resources within such system, facilitating efficient resource management and data handling.

Example implementation of the system may include one or more of the following features. A resource identifier generator may assign a unique RID to each resource upon its creation, with the RID being unrelated to the content of the resource. The resource identifier generator may also calculate and assign the RCID to the resource, with the RCID being reflective of the content of the resource and remaining immutable once assigned. The resource identifier generator may further calculate and assign the RTID to the resource, with the RTID being reflective of the resource's position in a DAG and considering the subgraph upstream of the resource.

The calculation of the RID is a straightforward process. Upon the creation of a resource, the resource identifier generator assigns a distinct RID to the resource. This assignment is independent of the content of the resource, emphasizing the role of the RID as a distinct identifier. This process of assigning the RID to the resource upon its creation ensures that each resource is immediately identifiable within such system, facilitating efficient resource management and data handling.

Calculation of the RCID may be implemented as follows. The resource identifier generator calculates the RCID as soon as possible, taking into account the content of the resource. If some data, which is requisite for RCID calculation, is absent, such system waits for this data to appear. The RCID is calculated as a hash of the concatenation of ResourceType (RType), ResourceData (RData), and of all pairs of FName and FCID of each input field. Once calculated, the RCID remains immutable and cannot change, thereby providing a stable reference to the content of the resource. The calculation of RCID can be represented as Equation (1).

$$RCID = \text{Hash}(RType \| RData \| (\|_{i \in Ins} FName_i \| FCID_i)) \quad (1)$$

Calculation of the RCID may be implemented as follows. The resource identifier generator calculates the RTID as soon as possible, taking into account the resource's position in a DAG and considering the subgraph upstream of the resource. The RTID is calculated as a hash of the RType, concatenated with RData, and concatenated with FName received at input and FTID of each input field. This calculation process ensures that the RTID accurately reflects the resource's position within the DAG. The calculation of RTID can be represented as Equation (2).

$$RTID = \text{Hash}(RType \| RData \| (\|_{i \in Ins} FName_i \| FTID_i)) \quad (2)$$

The calculation of RTID for the output field can be implemented as in Equation (3).

$$FTID_{Out} = \text{Hash}(RTID \| FName_i \|) \quad (3)$$

The association between RCID and RID can be tracked by the CID index. The CID index may detect duplicates of resources for deduplication and recovery. In addition, the glossary may recover canonical IDs of previously executed computations 117, enabling result recovery.

Component Description

Referring to FIG. 1, data management computer 110 may receive input data from the client device 120, process the input data, send it to the appropriate external (controller or other) device 130 for processing computations 117B, and then send the output data back to the client device 120. Data computer 110 also manages the execution of operations by the external device 130 based on the input data and manages the provision of the output data to the client device 120 based on the operations executed by the external device 130.

Client device 120 may load data (or sequences) that determine a list of operations that need to be completed. These operations may be performed by external device 130. The operations can be resource-intensive, requiring substantial amounts of input/output (IO), memory, and Central Processing Unit (CPU) time. Some operations may require extensive data analysis, such as building an in-memory index, which can be a time-consuming process. Furthermore, these operations may be reproducible, meaning that they can produce the same results when executed with the same parameters.

Client device 120 is a primary point of interaction between a user and system 100. It allows users to input data and receive output data. Client device 120 can take various forms, including graphical user interfaces, command-line interfaces, or application programming interfaces (APIs). Client device 120 may be designed to be user-friendly and intuitive, allowing users to easily input data and receive output data. It may include various input fields, buttons, sliders, or other interactive elements for receiving input data from the user. Similarly, it may include display areas, charts, graphs, plots or other visual elements for presenting output data to the user. Client device 120 may be connected with an input device 122 and an output device 124. The input device 122 and output device 124 may communicate with client device 120 via a user interface. Input device 122 may be a camera, microphone, keyboard, mouse, touchpad, or voice recognition device. Output device 124 may be a display, speaker, or printer. The input device 122 and the output device 124 are connected to data management computer 110 through network 140. Interface be a graphical user interface, a graphical user interface middle layer, a command-line interface (CLI), or any other system.

Client device 120 interacts with the data management computer 110. In some cases, client device 120 may also have direct communication with external device 130. This can be useful in situations where immediate feedback or real-time interaction is desired. In general, client device 120 primarily interacts with data management computer 110, which in turn manages the execution of operations by the external device 130. In some cases, client device 120 and external device 130 may be the same device.

In some cases, client device 120 may also include features for managing and monitoring the execution of computational tasks. For example, it may include progress bars, status indicators, or other visual cues to inform the user about the status of ongoing tasks. It may also include controls for pausing, resuming, or canceling tasks, as well as options for adjusting task parameters on the fly.

Overall, client device 120 plays an important role in system 100, serving as the primary point of interaction for users and facilitating the efficient management and execution of computational tasks.

Referring to FIG. 1, data management computer 110 plays a central role in platform system 100. It is configured to receive input data from client device 120 and execute operations on this data. The input data typically represents the parameters or computations 127 for a computational task. Data management computer 110 is responsible for managing the execution of operations within the platform system 100 based on this input data. In some cases, data management computer 110 may send the input data to the external device 130, which execute operations based on the input data received from client device 120. External device 130 may perform the actual computational tasks and provide the output data back to data management computer 110, and client device 120 based on the operations external device 130 execute. The output data represents the results of the computational tasks.

Data management computer 110 plays a pivotal role in generating nodes and managing their dependencies. Each node generated by the data management computer 110 may be characterized by node type, and references to other nodes (for example in a way described in implementation aspects).

The resources generated by data management computer 110 can be categorized into two types: root resources and normal resources. Root resources are a foundational part of such system. Once created, they exist in such systems and can be removed explicitly after receiving a deletion command. On the other hand, normal resources exist as long as they are referenced by any other resource or one of their fields.

When a normal resource is no longer referenced by any other resource and all caching periods are over, it may thereafter be deleted by such system. This process is generally known as "garbage collection." Garbage collection is a resource management strategy employed by such system to efficiently manage resources and reduce resource consumption. It ensures that resources that are no longer in use or relevant are removed from such system, thereby freeing up space and computational power for other operations.

Furthermore, data management computer 110 is capable of recovering results of previous operations in a new instance. This feature, known as resource recovery, enhances management efficiency by allowing it to reuse resources that have already been computed, thereby reducing the amount of computation that is performed. This not only saves computational time but also contributes to the efficient utilization of resources.

In one or more embodiments, once external device 130 have executed the operations and provided the output data, data management computer 110 then manages the provision of this output data back to client device 120. This allows the user to receive the results of the computational tasks. Data management computer 110 manages this process based on the operations executed by external device 130. In other words, data management computer 110 coordinates the flow of data between client device 120 and external device 130, ensuring that the computational tasks are executed efficiently and that the results are provided back to the user in a timely manner.

In some cases, data management computer 110 may be further configured to manage the execution of operations by external device 130 based on a set of rules that apply to individual nodes of a graph representing the operations and their dependencies. These rules can be used to optimize the execution of operations, for example, by deduplicating operations, recovering results of operations, or managing the provision of output data based on the operations executed by the controllers. This allows system 100 to efficiently manage the execution of complex computational tasks, even when these tasks involve multiple operations and dependencies.

Data management computer 110 can provide abstractions that allow client device 120 to describe the entire process for external device 130 to understand what task to perform, when to perform it, and what data to use. Every change in data management computer 110 may be applied transactionally.

Referring to FIG. 1, external device 130 is a component that executes operations based on the input data received from platform system 100. They provide the output data to the data management computer 110 based on the operations they execute. External device 130 is responsible for performing the actual computations 117, generating the results, and processing the input data according to the specific operations they are designed to execute. These operations can range from simple mathematical calculations to more complex tasks, such as data analysis, video processing or even construction of another computation graph, depending on the specific computational task at hand. This process is managed by data management computer 110, which coordinates the flow of data between client device 120 and external device 130.

External device 130 plays a pivotal role in executing the operations. These operations may be resource-intensive, requiring substantial amounts of input/output (IO), memory, and Central Processing Unit (CPU) time. For instance, some operations may necessitate extensive data analysis, such as building an in-memory index, which can be a time-consuming process. The system is designed to manage resource utilization effectively, ensuring such resource-intensive operations are executed only if necessary, preventing redundant work.

Furthermore, the operations executed by the external device 130 can be either physically or logically reproducible. This means that when these operations are executed with the same parameters, they can produce the same results. For instance, a file uploaded to the cloud and a file stored on a local drive may be physically different, but logically, they are the same file in terms of meaning for the operation that consumes it as input. Similarly, a service with equivalent parameters and environment started somewhere in the cluster to dynamically process the data or to serve external or internal requests can still provide the same results even though it may run on different hosts or clouds.

The property of some operations to be physically or logically reproducible is important some of disclosed systems performance. It allows to avoid unnecessary computations 117 and resource consumption by reusing the results of previously executed operations. This not just saves computational time but also contributes to the efficient utilization of resources.

External device 130 may perform a variety of tasks. One external device can create tasks for other external device, such as starting computations 117 inside cloud or cluster job management systems like Kubernetes or Slurm. Other external devices can perform operations with files inside various storage systems like AWS S3, Ceph or other network or local file systems. External device 130 can perform tasks in parallel or sequentially, depending on the task specifics.

In some cases, external device 130 can be software components running on a server, a hardware device, or a cloud-based service. External device 130 may be a separate external system, such as pod in Kubernetes, a virtual machine in clusters, or alike. The specific configuration of the external device 130 can vary depending on the requirements of the computational tasks and the resources available. Regardless of their specific configuration, external device 130 is designed to efficiently execute desired range of operations, from simple calculations to complex data analysis tasks, based on the input data received from data management computer 110 and to provide the output data back to data management computer 110 and client device 120 in a timely manner.

External device 130 play an important role in the system 100, executing the operations based on the input data received data management computer 110 and providing the output data back to data management computer 110 and client device 120 based on the operations they execute.

In one or more embodiments, the platform exhibits several main properties and advantages that contribute to its efficiency and effectiveness in managing large volumes of data.

One of these properties is that the same file is never stored in two different copies. Equivalent computations 117 are scheduled and computed only once, equivalent services are deployed only once, which greatly reduces the overall computation time for resource-intensive operations. Equivalent computations 117 are scheduled and computed only once. Equivalent services are deployed only once, which greatly reduces the overall computation time for resource-intensive operations.

Garbage Collection

Systems in one or more embodiments (referred as the platform in this section) can be configured to implement efficient garbage collection mechanism. Garbage collection may be implemented by garbage collector 105 of data management computer 110 as illustrated in FIG. 1. System keeps a resource (and possibly an external entity associated with it) as long as it is referenced by other resources. For instance, a file is stored on a drive as long as process requiring for computation is running or waiting to be executed and can be deleted after the computation result is passed to the downstream consumer. This garbage collection mechanism contributes to efficient resource management, leading to improved performance and reduced resource consumption. When a computation is completed and its results are no longer supported by any other node, the platform removes these results to free up storage space. This feature is particularly useful in scenarios of handling of large files or large numbers of files, as it ensures that storage space is not wasted on unnecessary data. The platform may also be designed to perform garbage collection of one or more resources after detection of expiration of all caching periods set for a corresponding node according to the pipeline configuration. This allows for efficient management of resources and operations, leading to improved performance and reduced resource consumption.

Figure 2:
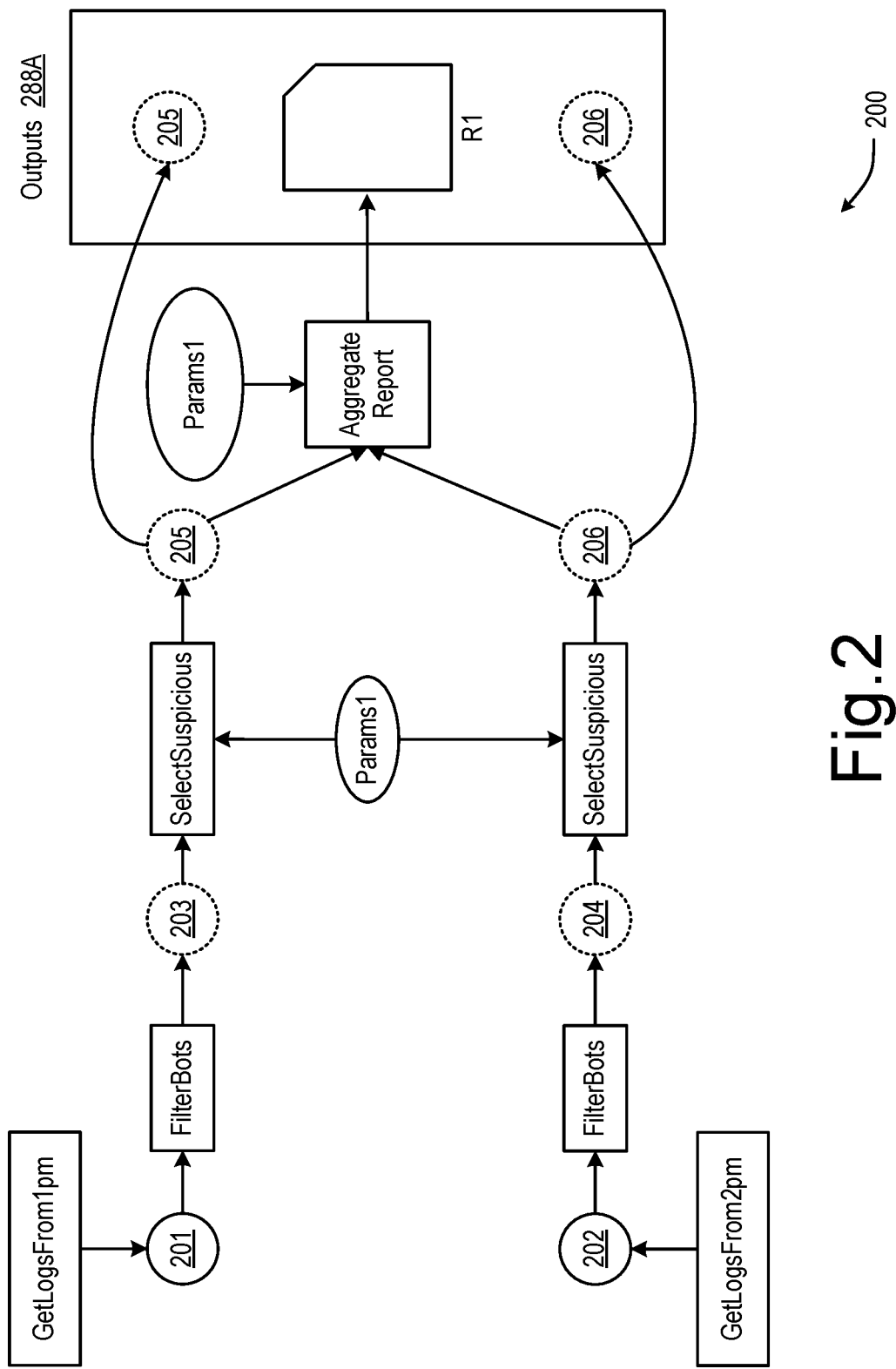
FIG. 2 is a diagram illustrating an example pipeline created and initialized based on a user request, according to some embodiments.

FIG. 2 illustrates an example pipeline 200 (as a flow depiction system) created and initialized based on a user request, according to some embodiments. In this example, a user wants to analyze huge log files to find out new potential suspicious activity in a given period of time. It may take several analytic operations with different parameters, each producing its own report based on data from source log files. Because of the iterative nature of the analysis, the same pipeline can be instantiated multiple times with slightly different parameters and inputs. The responsibility of the platform is to optimize the calculations and avoid re-running the same calculations for the results that already exist.

The user may request to create a graph representing computations 117 and obtain the results of the computations 117. The user's request is input to a user interface and the user interface communicates with the data management computer (e.g., data management computer 110). Certain objects are marked to be placed to "Outputs" as depicted below. These objects will be kept as long as they are not explicitly deleted by the user. The scheme illustrated in FIG. 2 is to get log files from both 1 pm and 2 pm. Each log file is processed in parallel through a series of operations. Data 201 to 206 represent static data (e.g. of one or more files) that will be produced during the pipeline execution. The parameter Params1 is input to both SelectSuspicious operations and data 205 and 206 are computed respectively. Then data 205 and 206 will be added to the AggregateReport operation with the Params1 parameter. Outputs 288A include the computation results R1 and the references to data 205 and 206.

Systems in one or more embodiments can be configured to identify operations that may start immediately based on their input requirements. For instance, operations such as GetLogsFrom1 pm and GetLogsFrom2 pm, which do not have any inputs, may be scheduled for execution right away as they have no unmet dependencies. All other operations that require inputs from previous operations will wait until their requirements are met. As GetLogsFrom1 pm is done, it produces data 201 and FilterBots becomes ready for execution. Similarly, GetLogsFrom2 pm generates data 202 and both FilterBots operations' requirements are met now.

Figure 3:
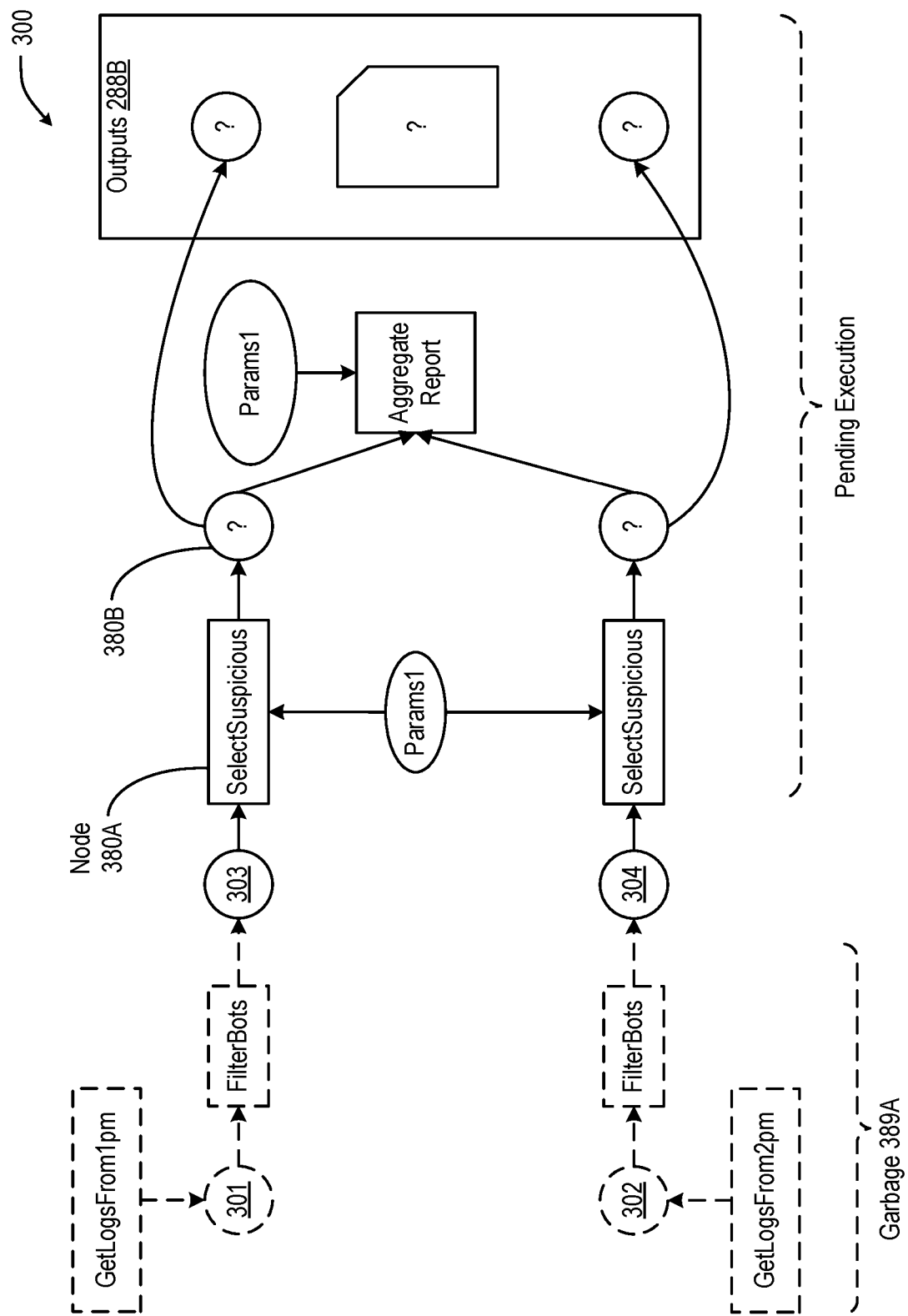
FIG. 3 is a diagram illustrating the example pipeline of FIG. 2 being executed at a set time, according to some embodiments.

FIG. 3 illustrates an example pipeline 300 like that of FIG. 2 being executed at a set time, according to some embodiments. As each operation is executed and its output is produced, the platform may manage the storage space by removing input files that are not further used by any operation. This can help to optimize the storage space, especially when dealing with large files or with many files. For example, referring to FIG. 3, both FilterBots operations are finished. They produced data 303 and 304, respectively. The input of FilterBots (e.g. data 301 and 302) is not used by anyone anymore, it can be safely removed not to waste storage space. GetLogsFrom1 pm and GetLogsFrom2 pm operations are also "collected" as garbage 389A (e.g. by a garbage collection protocol). The rest of the operations down the pipeline 300 are waiting for execution, which will culminate in one or more pipeline outputs 288B as shown.

In all of the "pipelines" of FIGS. 2-12, nodes 380 are depicted as ovals or rectangles. Nodes like node 380A signal one or more operations, requests, or other protocols. Such nodes are referred to as "compute nodes" herein and may contain requests for computations 117. Nodes like node 380B signal a populated or other placeholder for data.

Figure 4:
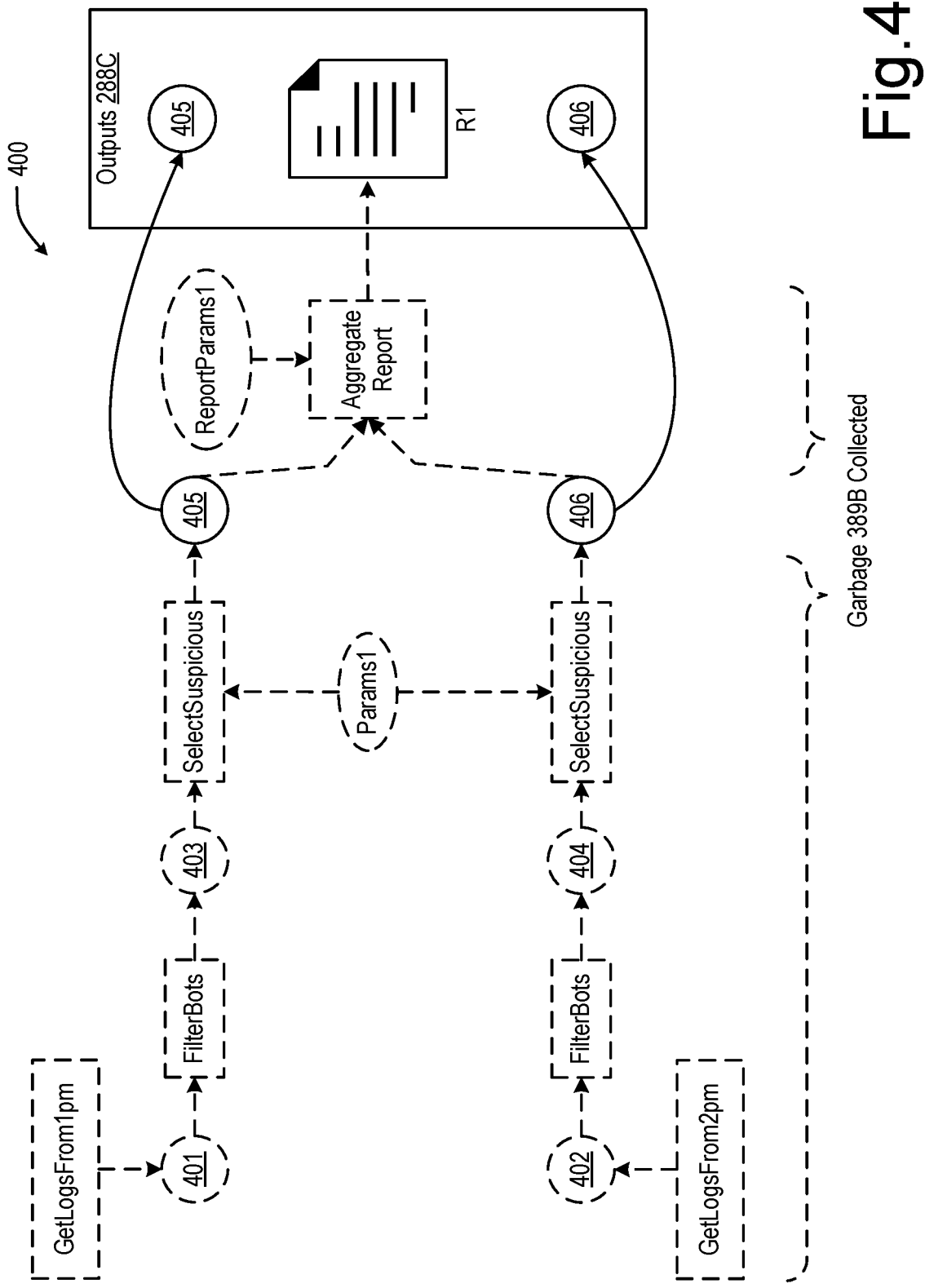
FIG. 4 is a diagram illustrating the example pipeline of FIG. 1 being executed at another set time, according to some embodiments.

FIG. 4 illustrates a pipeline 400 resulting from the example pipeline 200 of FIG. 2 being executed at another set time, according to some embodiments. The GetLogsFrom1 pm and GetLogsFrom2 pm branches can run in parallel until the AggregateReport operation. The SelectSuspicious operations will wait for results of FilterBots operations, while AggregateReport operation will wait for both branches to produce 405 and 406 to be able to start. Then one or more instances of data 405, 406, and R1 will be "published" as one or more pipeline outputs 288C. All intermediate results 401, 402, 403, and 404, as well as Params1 and ReportParams1 will be removed by a collector of (what has become) garbage 389B after they become "unneeded," i.e., not supported by any other node.

Recovery

Systems in one or more embodiments (referred as the platform in this section) can be configured to automatically recover the results of previous computations 117 when part of the computational pipeline is repeated. The recovery feature may be implemented by recovery logic 106 of data management computer 110 as illustrated in FIG. 1. This feature, referred to as operation recovery, is particularly beneficial in terms of efficiency and resource management. Operation recovery refers to the process of retrieving previously computed results of operations. When the platform receives input data from the user interface, it first checks if the same operation, with the same input data, has been executed before. If such an operation has been executed and its result is still registered in the platform, the platform does not trigger the execution of the operation again. Instead, it directly provides the previously computed result as the output data.

The result of an operation or a DAG is automatically restored if the equivalent operation or a DAG was previously executed, and its result is still registered in the platform. The platform also accounts for intermediate results at all stages of data processing. Information preserved after resource removal allows the platform to be able to recover certain metadata based on the previously observed graph states, helping to identify equivalent subgraphs that existed at one of the previous points in time. This auxiliary information has its own lifecycle rules that allow it to be automatically removed when it is not expected to be used in the future, saving the storage space and computational resources consumed by the platform itself.

Operation recovery is particularly beneficial in terms of efficiency and resource management. By reusing previously computed results, the platform can save computational resources, such as processing power and memory. This can lead to a reduction in the overall execution time of the computational tasks, thereby improving the efficiency of analysis. Furthermore, by reusing previously computed results, the platform can also reduce the amount of data storage and data transfer, which can lead to cost savings.

Figure 5:
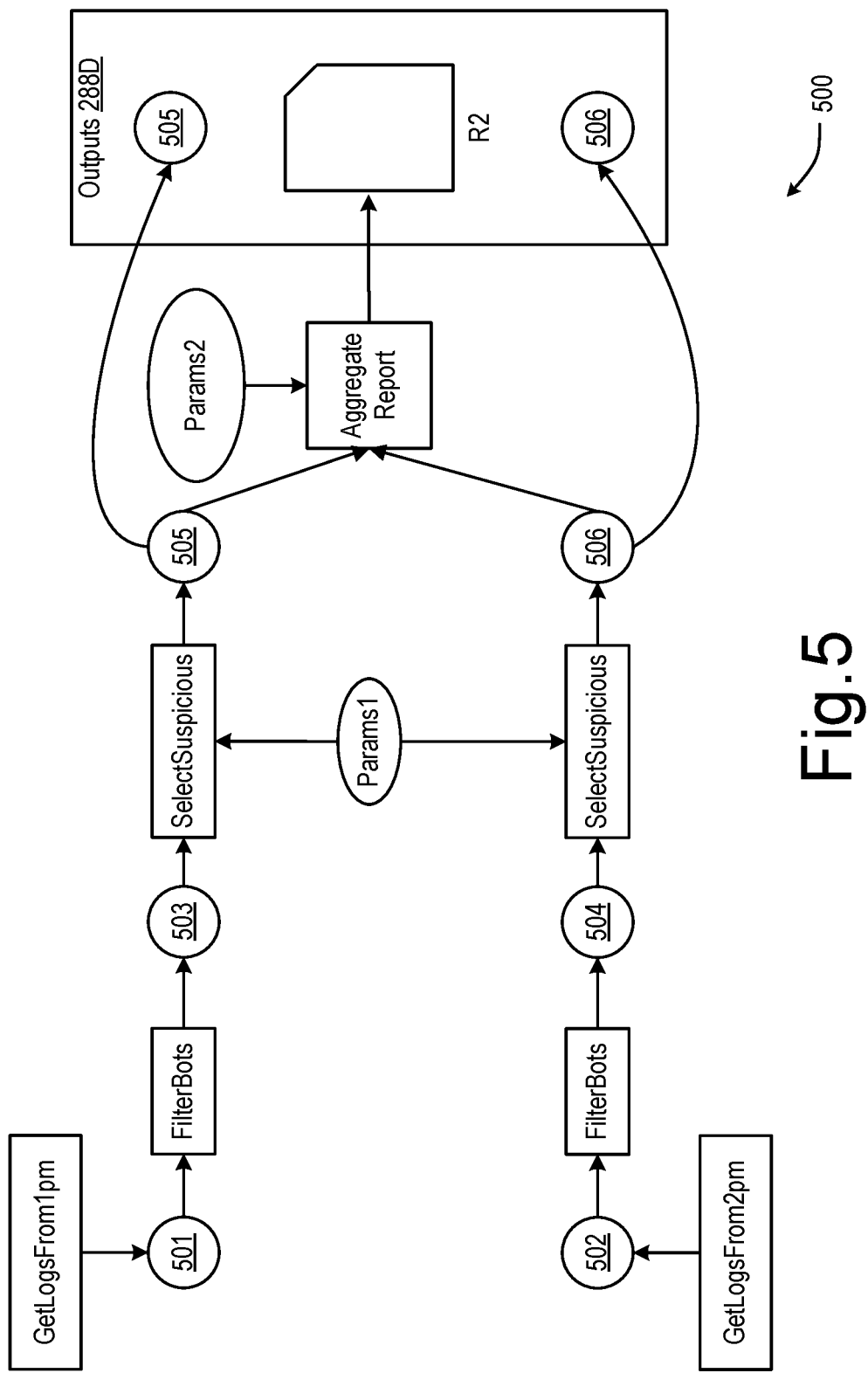
FIG. 5 is a diagram illustrating another example pipeline created and initialized based on a user request, according to some embodiments.

FIG. 5 illustrates another example pipeline created and initialized based on a user request, according to some embodiments relating to staging of data 501-506 somewhat like that of FIGS. 2-4 above. The pipeline 500 illustrated in FIG. 5 is different from the one in FIG. 2, however, in one or more Params2 that used for an AggregateReport operation as shown. In one embodiment, this signifies that a user may decide to change part of the parameters illustrated in FIG. 2, such as by changing Params1 to Params2. Although the other parameters in the new run remain the same as the previous run in FIG. 2, one or more corresponding outputs 288D of pipeline 500 as shown may differ.

Figure 6:
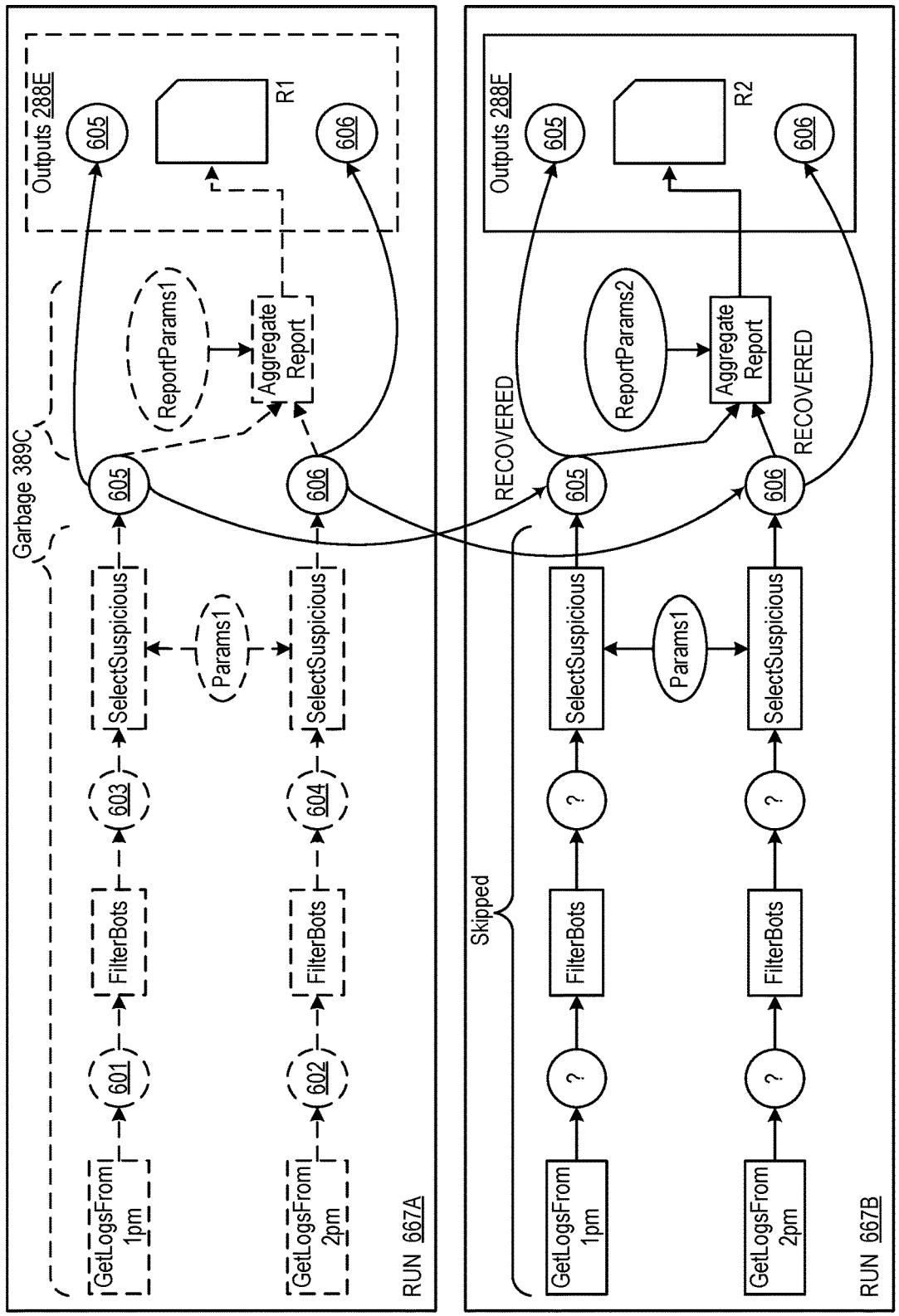
FIG. 6 is a diagram illustrating two parallel runs based on a user request, according to some embodiments.

FIG. 6 illustrates two parallel runs 667A, 667B of a pipeline 600 based on a user request, according to some embodiments relating to staging of data 601-606 somewhat like that of FIGS. 2-5 above. The platform can detect that the first steps of the new run 667B were already executed in a previous run 667A. The previous run 667A has produced results 605 and 606, which are still present in the platform. It means that the platform can provide all required inputs to AggregateReport operation without triggering execution of earlier operations in the pipeline 600. The platform can skip FilterBots and SelectSuspicious operations, for example, and trigger only AggregateReport operation. A main benefit here is that all implementation details of results can be recovered and remained inside the platform, allowing the user interface (e.g., Graphical UI) to focus on the operations, and share results of pricey operation to be reused in several pipelines, even in the case they are managed by different users connected to the same instance of the platform.

Referring to FIG. 6, the operations of GetLogsFrom1 pm, GetLogsFrom2 pm, FilterBots, and SelectSuspicious and the intermediate results generated by these operations are skipped in the new run 667B. After AggregateReport finishes its work using new parameter ReportParams2, the resulting R2, 605, and 606 are saved as Outputs 288F that are more easily obtained than the Outputs 288E that might have instead been re-created by starting over. After this, operation AggregateReport and parameter ReportParams2 will be removed. And at some suitable time (e.g. before or after Outputs 288F are finalized) garbage 389C of the previous run 667A is collected.

Figure 7:
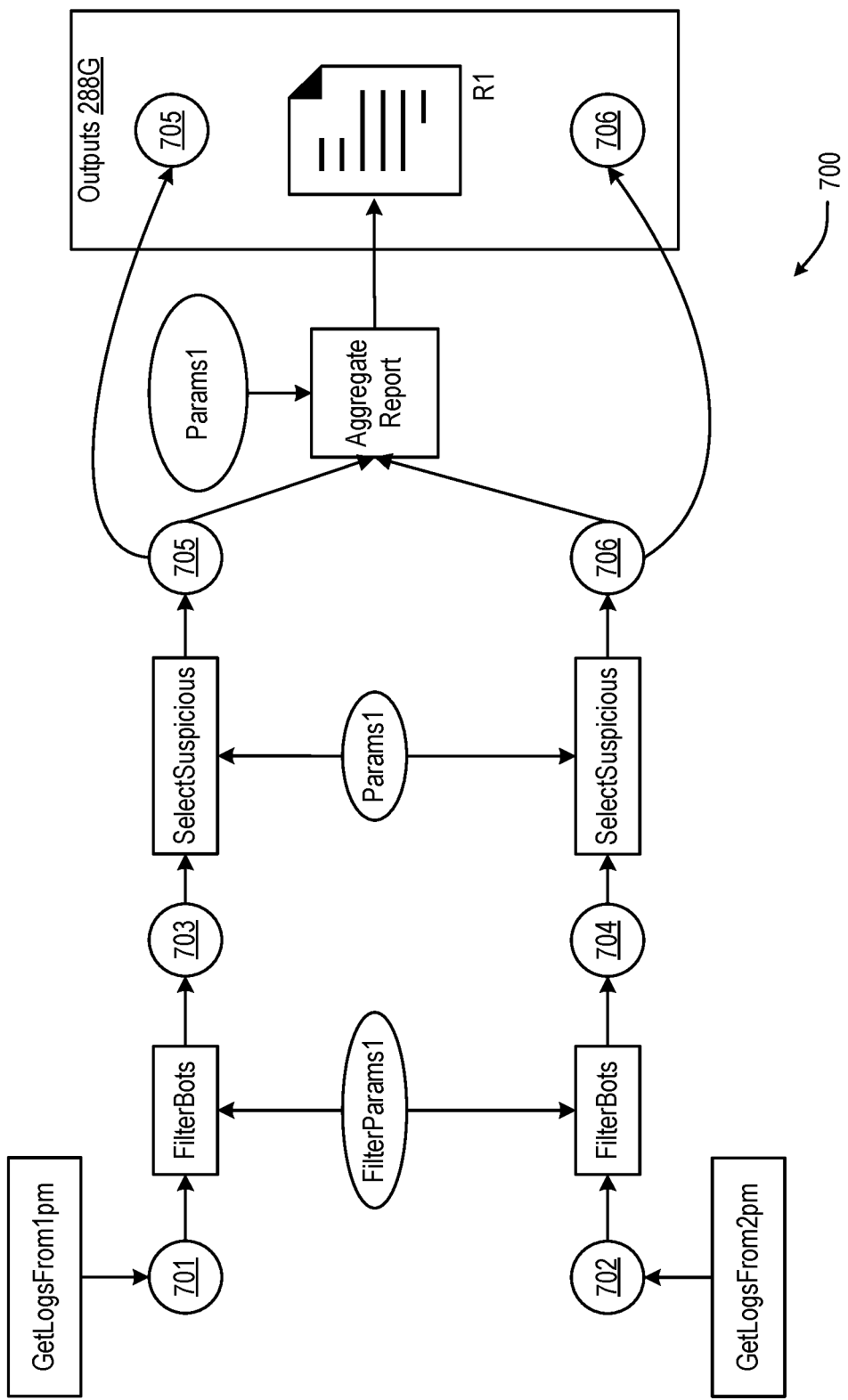
FIG. 7 is a diagram illustrating another example pipeline created and initialized based on a user request, according to some embodiments.

FIG. 7 illustrates another example pipeline 700 created and initialized based on a user request, according to some embodiments relating to staging of data 701-706 resembling that of FIGS. 2-6 above. The user creates the initial pipeline as illustrated in FIG. 7 which provides one or more outputs 288G as shown.

Figure 8:
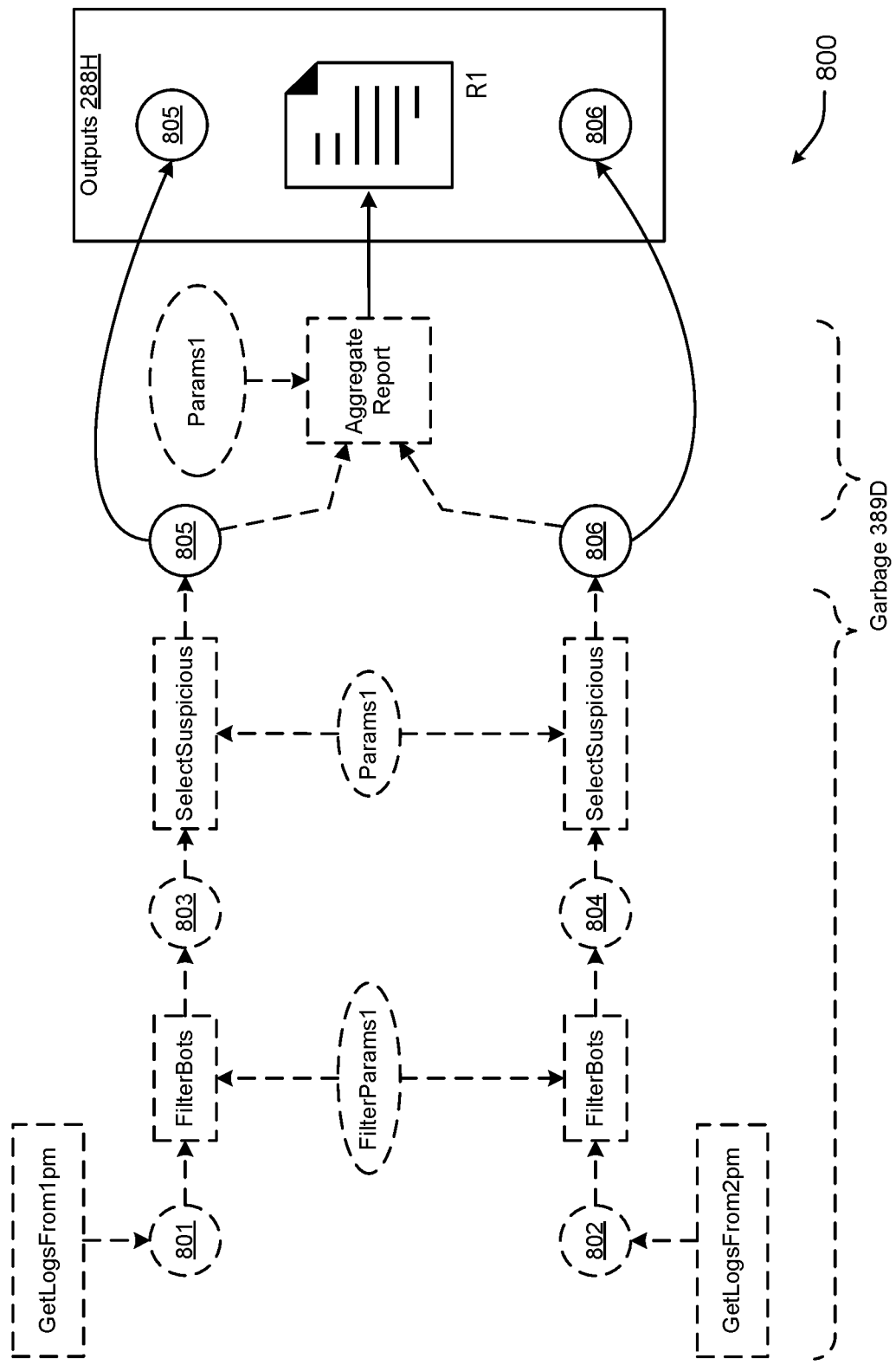
FIG. 8 is a diagram illustrating the example pipeline of FIG. 7 being executed at a set time, according to some embodiments.

FIG. 8 illustrates a pipeline 800 derived from that of pipeline 700 of FIG. 7 being executed at a set time, according to some embodiments relating to staging of data 801-806 somewhat like that of FIGS. 2-7 above. After all the execution is done, the platform reaches the final state. Data 705 and 706 and R1 are stored in Outputs 288H, all intermediate results and operations parameters are collected as garbage 389D.

Figure 9:
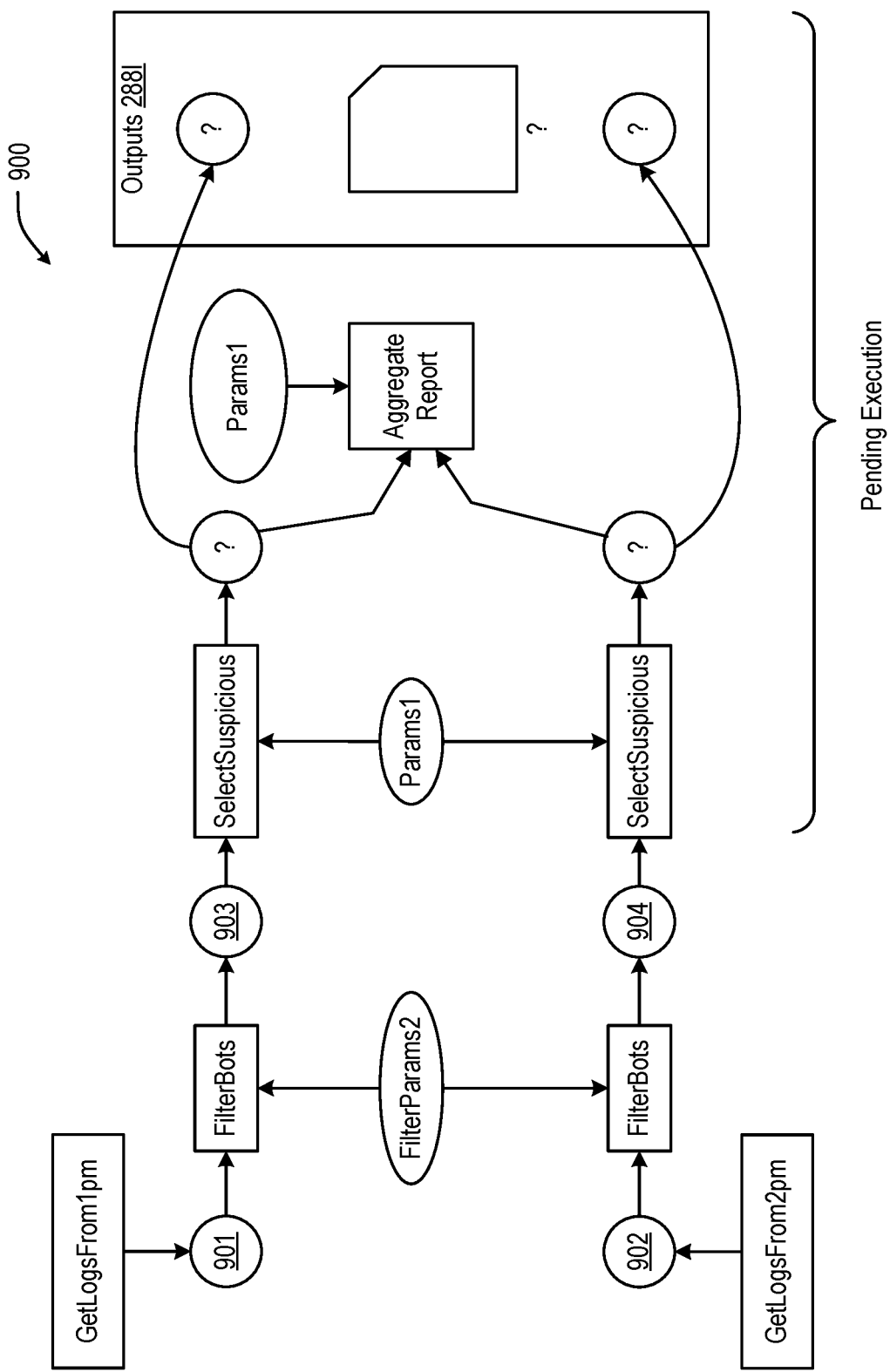
FIG. 9 is a diagram illustrating the example pipeline of FIG. 7 being executed at another set time with different parameters, according to some embodiments.

FIG. 9 illustrates a pipeline 900 derived from the example pipeline 700 of FIG. 7 being executed at another set time with different parameters, according to some embodiments relating to staging of data 901-904 somewhat like that of (one or more of) FIGS. 2-8 above. In the illustrated embodiment of pipeline 900, the user may decide to change the parameter FilterParams1 to FilterParams2 as illustrated in FIG. 9. The platform decides that the operations GetLogsFrom1 pm and GetLogsFrom2 pm need to be triggered as their results (i.e., 701 and 702) are required for FilterBots operations. Both FilterBots operations will be executed again as their parameters differ from the previous run. Then the platform releases FilterBots operations for execution and despite changed parameters, they may happen to produce the same results as in the previous run (e.g., stricter filtration criteria did not find any new bot requests). This means that all inputs of SelectSuspicious and AggregateReport will be the same as the previous run, en route to becoming one or more corresponding Outputs 288I, even though they were obtained from different operations.

Figure 10:
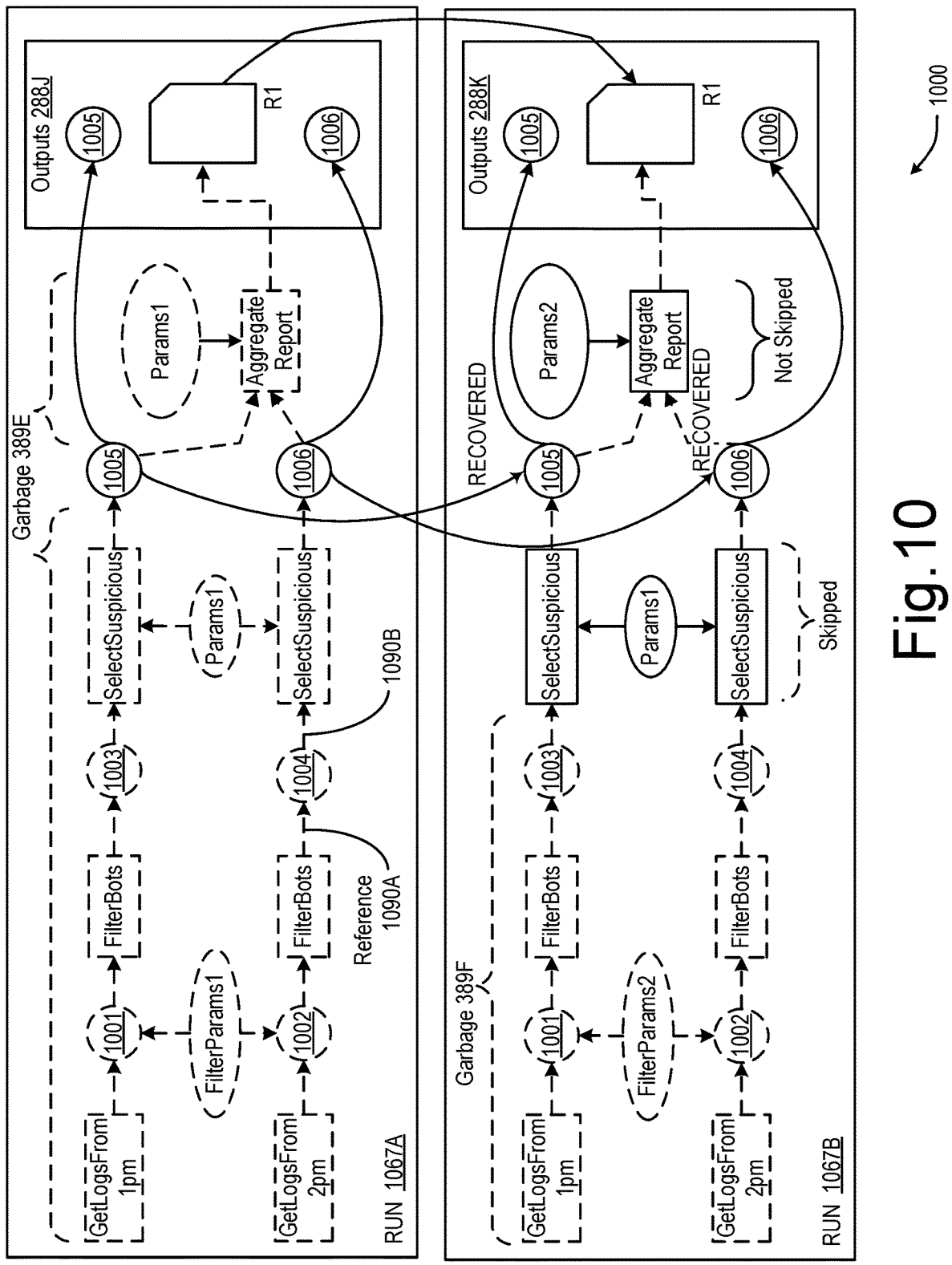
FIG. 10 is a diagram illustrating two parallel runs based on the pipelines illustrated in FIGS. 7 and 9, according to some embodiments.

FIG. 10 illustrates another pipeline 1000 comprising two parallel runs 1067A-B based on the pipelines illustrated in FIGS. 7 and 9, according to some embodiments relating to staging of data 1001-1006 in nodes 380 as shown. Because SelectSuspicious nodes 380 were already executed for data 1003 and 1004 earlier in run 1067A and the final result of the later run 1067B is registered in the platform, the platform will simply provide data 1005, 1006 to the outputs 288K of the later run 1067B without triggering redundant operations. Accordingly the operations SelectSuspicious are skipped, thereby causing the platform to make large swaths of garbage 389E-F available for collection without any corresponding degradation of one or more correct outputs 288K. See FIG. 13.

In all of the "pipelines" of FIGS. 2-12, references 1090 are depicted as arrows. Reference 1090A signals that FilterBots "is referenced by" data 1004. Reference 1090B signals that SelectSuspicious "references" data 1004.

Cache

Systems in one or more embodiments (referred to as "the platform" herein) can be configured in such a way so that some nodes 380 can be assigned with a cache period. In this way any computation result can be protected from garbage collection for a specified period of time even after all the references to it were lost (after it is no longer used by any other resource). The cache feature may be implemented by cache logic 104 of data management computer 110 as illustrated in FIG. 1. This allows the platform to automatically keep the results in case someone needs them in the future and becomes greatly useful in combination with automatic deduplication and recovery.

Figure 11:
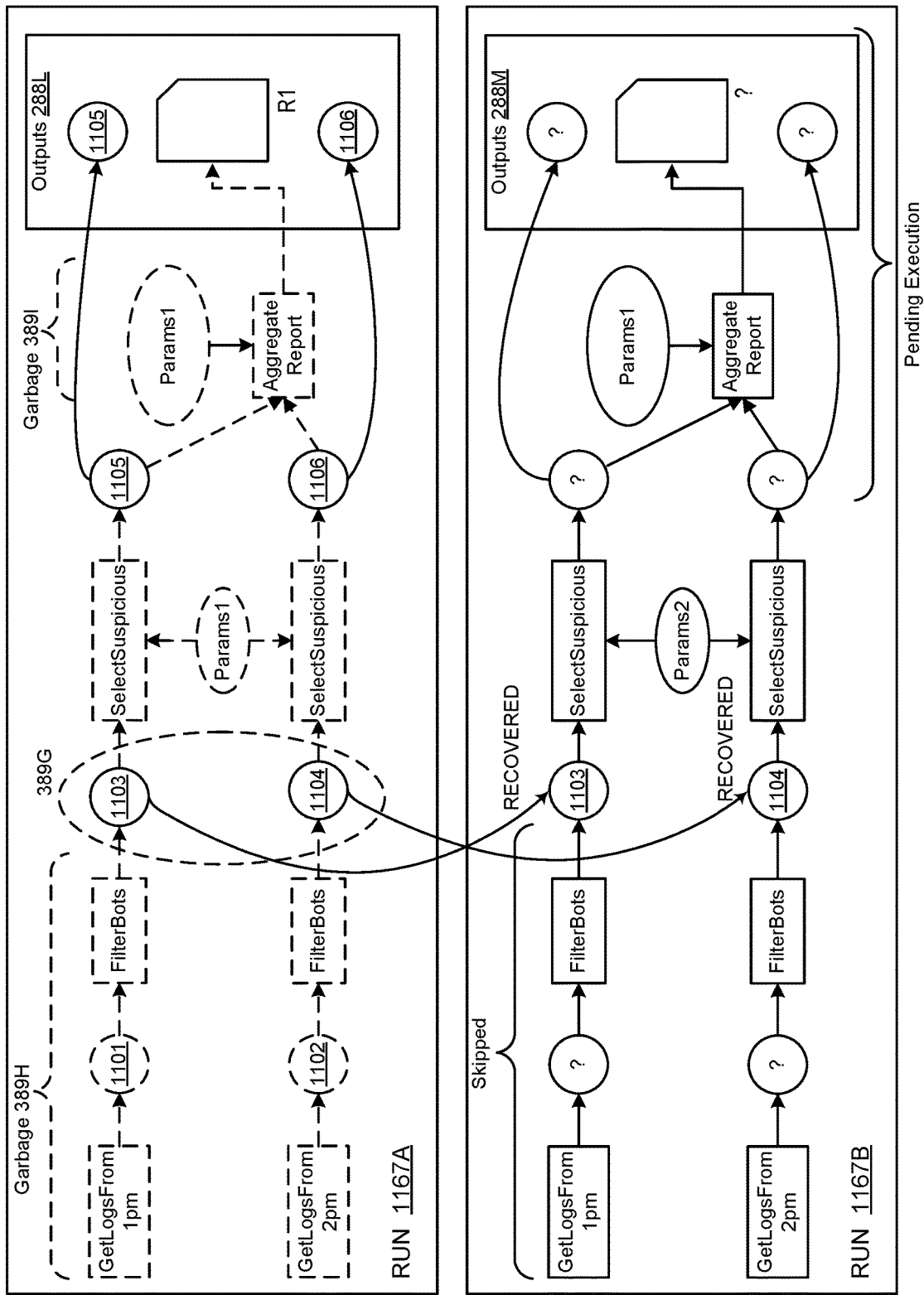
FIG. 11 is a diagram illustrating two parallel runs based on the pipeline illustrated in FIG. 2 being executed at a set time with different parameters, according to some embodiments.

FIG. 11 illustrates another example pipeline 1100 comprising at least two parallel runs 1167A-B based on the pipeline 200 illustrated in FIG. 2 being executed at a set time with different parameters, relating to staging of data 1101-1106 as shown. In one embodiment, the user initially created all the same chain of resources as in FIG. 2 but also set a set of cache rules for the results of FilterBots operations. The cache rules (relating prospectively to future garbage 389G) temporarily prevent data 1103 and 1104 from being removed by the garbage collector after FilterBots operations are done, in contrast to garbage 389H-I. Garbage 389H-I are not protected by cache rules and so they are eligible to be collected before garbage 389G. After all operations are done and all results are saved as outputs 288M, the platform keeps data 1103 and 1104, even no other operations are currently using them as input. Data 1103 and 1104 will remain in the platform until cache frees them, even if the user removes the outputs 288L of the previous run 1167A.

In one embodiment, the user creates the same pipeline, but changes the SelectSuspicious operation parameter Params1 to Params2. Referring to FIG. 11, as the first part of later run 1167B is the same as that of earlier run 1167A (the operations GetLogsFrom1 pm and following FilterBots), the platform system 100 can find that these two chains should produce data 1103 and 1104. Because of cache data 1103 and 1104 still existing in the platform, they can be used as inputs for operation SelectSuspicious without running the operation GetLogsFrom1 pm, GetLogsFrom2 pm, and FilterBots.

Deduplication

Systems in one or more embodiments (referred as the platform in this section) can be configured to perform the deduplication of operations. Deduplication feature may be implemented by deduplication logic 108 of data management computer 110 as illustrated in FIG. 1. Deduplication, in this context, refers to the process of identifying and eliminating redundant operations being scheduled for execution of awaiting their inputs. When the platform receives input data from the client device, it first checks if the same operation, with the same input data, has been executed before. If such an operation has been executed and its result is still registered in the platform, the platform does not trigger the execution of the operation again. Instead, it directly provides the previously computed result as the output data. This process is referred to as operation result recovery. But the platform is not only capable of recovering those results that are "rooted" by their producing branch of the computational graph at the very beginning of the pipeline, but also the equivalence of subgraphs when they become evident only after some intermediate results are generated.

Operation deduplication is particularly beneficial in terms of efficiency and resource management. By eliminating the execution of redundant operations, the platform can save computational resources, such as processing power and memory. This can lead to a reduction in the overall execution time of the computational tasks, thereby improving the efficiency of the platform. Furthermore, by reusing previously computed results, the platform can also reduce the amount of data storage and data transfer, which can lead to cost savings.

It's worth noting that the effectiveness of operation deduplication depends on the nature of the operations and the input data. For operations that are deterministic and stateless, meaning they produce the same output given the same input, operation deduplication can be particularly effective. However, for operations that are non-deterministic or stateful, meaning their output can vary even with the same input, operation deduplication may not be applicable or may require additional considerations. So the platform can be configured in a way that those two types of cases can be accounted, and some nodes can be marked as non-reproducible, effectively turning off for them the logic described above.

Figure 12:
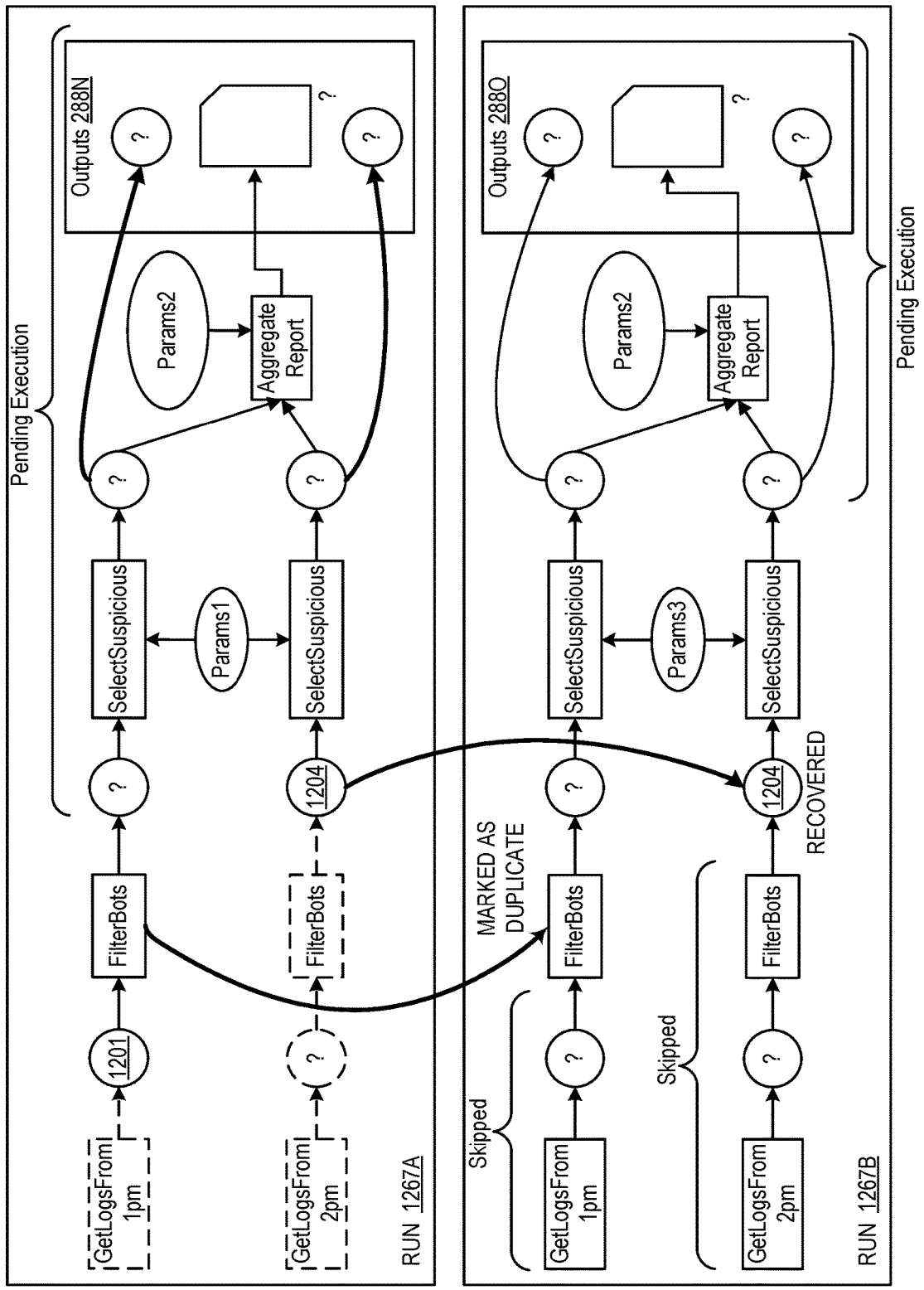
FIG. 12 illustrates two parallel runs based on the pipeline illustrated in FIG. 2 being executed at another set time with different parameters, according to some embodiments.

FIG. 12 illustrates two parallel runs 1267A-B based on another pipeline 1200 based on that of FIG. 2 being executed at another set time with different parameters, according to some embodiments relating to staging of data 1201-1206 as shown. In one embodiment, the user is interested in obtaining a certain output accordingly changes one or more parameters of SelectSuspicous operation Params3 before the execution with the "Params1" value is finished. Application of the transition from calculations with Params1 to Params3 may happen in two steps. In the first step, a second run 1267B is instantiated and initialized, so all the deduplication logic is executed for it.

At this moment of execution with regard to data 1201-1206, FilterBots operation for data 1201 in run 1267A is running and this FilterBots operation's input data 1201 is present. The computation output of this FilterBots operation has not yet been determined. The platform detects that GetLogsFrom1 pm operation in the second run 1267B will produce the same result data 1201 as the first run 1267A since operation GetLogsFrom1 pm is a pure function and it has no inputs. This means that FilterBots operation for data 1201 in the second run 1267B will be the same as in the first run 1267A. There is no need to run the same operation twice in parallel. Thus, the platform responds by marking the paralleled FilterBots operation in the second run 1267B as a duplicate and await results from the computation in the first run 1267A.

At the same time, in the first run 1267A, data 1204 has already been created. The platform detected the presence of data 1204 and recovered it in the second run 1267B. The input for SelectSuspicious operation in the second run 1267B is ready. Although SelectSuspicious operation for data 1204 is running in the first run 1267A, the platform will not mark the corresponding operation in the second run 1267B a duplicate because it receives different parameter (Params3 v. Params1) than the one in the first run 1267A. The SelectSuspicious operation for data 1204 in the second run 1267B still needs to be executed.

In the second step of the transition, the first run 1267A is terminated. The deduplication logic described herein can be applied to "transition" operations from one (instance of a) run to another. It can safely cancel obsolete pipeline operations and preserve the active operations if they are applicable to the new pipeline incarnation. In the embodiment described in FIG. 12, the user can create the second run 1267B and then cancel the first one by removing Outputs 288N. This leads to the removal of all scheduled operations from the first run 1267A that are not used by the second run 1267B to obtain Outputs 288O as shown. At the same time, the already running operation FilterBots in the first run 1267A will not get interrupted and will continue until it produces the result, thus saving time and resources, compared to the situation where it was cancelled and started again from the beginning inside the second run 1267B.

The platform also may identify and perform partial deduplication and recovery of DAGs. This feature facilitates true interactive and iterative work with batch-like computational tasks. Suppose any of the subgraphs of a newly created DAG currently runs anywhere in the platform (or was already computed and the result are registered in the system). In that case, it will be picked up and piggybacked by new computations 117, so there is no need for double resource spending on the same task, or even the need to interrupt running computations 117 if they are part of a newly created DAG.

FIG. 12 illustrates two parallel runs based on the pipeline illustrated in FIG. 2 being executed at another set time with different parameters, according to some embodiments.

Figure 13:
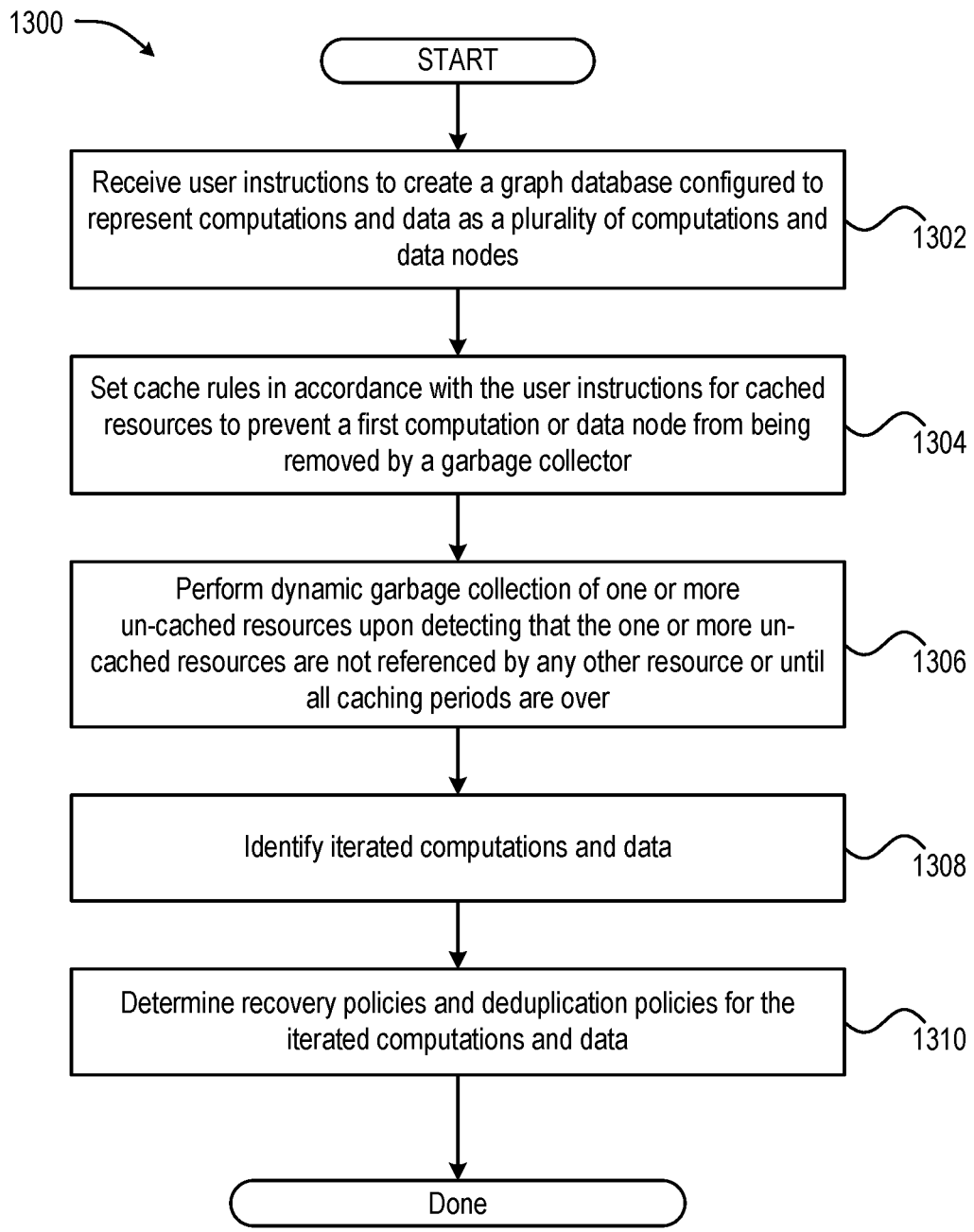
FIG. 13 is a flowchart of one example embodiment implemented within the platform system, according to some embodiments.

FIG. 13 is a flowchart 1300 of one example embodiment implemented within the platform system, according to some embodiments. Operation 1302 describes receiving user computations to create a graph database configured to represent computations and data as a plurality of computations and data nodes. Operation 1304 describes setting cache rules in accordance with the user computations for cached resources to prevent a first computation or data node from being removed by a garbage collector. Operation 1306 describes perform dynamic garbage collection of one or more un-cached resources upon detecting that the one or more un-cached resources are not referenced by any other resource or until all caching periods are over. Operation 1308 describes identifying iterated computations and data. Operation 1310 describes determining recovery policies and deduplication policies for the iterated computations and data.

In light of teachings herein, numerous existing techniques may be applied for configuring special-purpose circuitry or other structures effective for recovery, deduplication, garbage collection, and other maintenance issues as described herein without undue experimentation. See, e.g., US Pub. No. 2017/0337138 ("Dynamic cache management for in-memory data analytic platforms"); US Pub. No. 10,976,965 ("Optimization of in-memory processing of data represented by an acyclic graph so that the removal and re-materialization of data in selected nodes is minimized"); US Pub. No. 2015/0234935 ("Database calculation using parallel-computation in a directed acyclic graph"); US Pub. No. 2022/0006706 ("On-the-fly reorganization of directed acyclic graph nodes of a computing service for high integration flexibility"); US Pub. No. 2018/0246988 ("Executable graph framework for the management of complex systems"); US Pub. No. 2020/0311076 ("Database partition pruning using dependency graph"); and EP App. 4064609A1 ("Directed acyclic graph of blocks data structure and node communication").

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

Clause 1. A device-implemented method for optimized computation and data management (e.g. performed in or via a variant of system 100) comprising:

invoking transistor-based circuitry (e.g. by a processor 118 or other event-sequencing circuitry) configured to obtain one or more instructions 127 that cause a first graph 115 to be configured that represents one or more computations 117 as one or more computation nodes 380 and (one or more respective instances of) data 201-206, 301-306, 401-406, 501-506, 601-606, 701-706, 801-806, 901-906, 1001-1006, 1101-1106, 1201-1206 as (one or more unpopulated or populated) data nodes 380 invoking transistor-based circuitry (e.g. by other event-sequencing circuitry) configured to identify a first computation node of said one or more computation nodes that represents a corresponding one of the one or more computations 117 that is ready to be performed;

invoking transistor-based circuitry (e.g. by other event-sequencing circuitry) configured to populate a first data node of the data nodes that references said first computation node by causing a first computation that corresponds to said first computation node to be performed (immediately or otherwise) in response to said identifying wherein said populating said first data node includes causing a reference 1090 to said first computation node to become removed;

invoking transistor-based circuitry (e.g. by other event-sequencing circuitry) configured to perform at least some garbage collection upon said first computation node; and invoking transistor-based circuitry (e.g. by other event-sequencing circuitry) configured to mitigate redundant processing in response to one or more invoked instructions of a first node or subgraph component by comparing said first node or subgraph component with a second node or subgraph component and (aborting or preventing an invocation of said first node or subgraph component or otherwise) obtaining a result of said second node or subgraph component in lieu of regenerating said result of said second node or subgraph component.

Clause 2. The method of any of the above method clauses comprising:
obtaining said one or more instructions that cause said first graph 115 to be configured that represents said one or more computations 117 as said one or more computation nodes and data as one or more populated data nodes.

Clause 3. The method of any of the above method clauses comprising:
obtaining said one or more instructions that cause said first graph to be configured that represents said one or more computations 117 as said one or more computation nodes and data as one or more unpopulated data nodes.

Clause 4. The method of any of the above method clauses comprising:
obtaining said one or more instructions that cause said first graph to be configured that represents said one or more computations 117 as said one or more computation nodes and data as one or more data nodes and wherein first and second types of resources, a topology of resource interlinks therebetween, and one or more pre-assigned input values are included in said one or more instructions that cause said first graph to be configured.

Clause 5. The method of any of the above method clauses comprising:
mitigating said redundant processing in said response to said one or more invoked instructions of said first node or subgraph component by comparing said first node or subgraph component with a prior second node or subgraph component.

Clause 6. The method of any of the above method clauses comprising:
mitigating said redundant processing in said response to said one or more invoked instructions of said first node or subgraph component wherein said mitigating comprises:
detecting one or more operations in a later code sequence instance that produce a same outcome as a corresponding one or more operations in a prior code sequence instance;
marking the one or more operations in the later code sequence instance as a duplicate;
applying the corresponding one or more operations in the later code sequence instance to the prior code sequence instance; and
terminating the later code sequence instance.

Clause 7. The method of any of the above method clauses wherein said obtaining said result of said second node or subgraph component comprises:
extracting computations 117 and data that are rooted in a graph database.

Clause 8. The method of any of the above method clauses wherein said obtaining said result of said second node or subgraph component comprises:
extracting intermediate computations 117 and data that are isomorphic subgraphs rooted in a graph database (e.g. in storage 116).

Clause 9. The method of any of the above method clauses comprising:
identifying computations 117 in a first graph of operation that are at least partially executed in a second graph of operation pursuant to one or more result recovery policies; and
identifying data associated with the identified computations 117 and present in a first graph of operation also pursuant to said one or more result recovery policies.

Clause 10. The method of any of the above method clauses comprising:
identifying computations 117 in a first graph of operation that are at least partially executed in a second graph of operation pursuant to one or more result recovery policies;
identifying data associated with the identified computations 117 and present in a first graph of operation also pursuant to said one or more result recovery policies; and
providing both the computations 117 in the first graph of operation that are at least partially executed in the second graph of operation and the data associated with the identified computations 117 and present in the first graph of operation without contemporaneously (i.e. less than 24 hours later) triggering execution of said first graph of operation.

Clause 11. The method of any of the above method clauses wherein said automatically mitigating said redundant processing in said response to said one or more invoked instructions of said first node or subgraph component by comparing said fingerprint of said first node or subgraph component with said fingerprint of said second node or subgraph component comprises:
automatically aborting an invocation of said first node or subgraph component.

Clause 12. The method of any of the above method clauses wherein said automatically mitigating said redundant processing in said response to said one or more invoked instructions of said first node or subgraph component (or both) by comparing said fingerprint of said first node or subgraph component with said fingerprint of said second node or subgraph component comprises:

automatically blocking an invocation of said first node or subgraph component.

Clause 13. The method of any of the above method clauses wherein said automatically mitigating said redundant processing in said response to said one or more invoked instructions of said first node or subgraph component (or both) by comparing said fingerprint of said first node or subgraph component with said fingerprint of said second node or subgraph component comprises:

automatically preventing an invocation of said first node or subgraph component.

Clause 14. The method of any of the above method clauses comprising:

performing dynamic garbage collection of computation nodes (e.g. SelectSuspicious," "AggregateReport," or other interim stages shown in a rectangle) in response to determining that future results of these computation nodes (e.g. as intermediate data that reference a corresponding node) are not referenced by any other computation nodes of said one or more computation nodes.

Clause 15. The method of any of the above method clauses comprising:

performing dynamic garbage collection of data nodes in response to determining that these data nodes 380 are not referenced by any inputs of said one or more computation nodes 380.

Clause 16. A device-implemented system 100 for optimized computation and data management comprising:

transistor-based circuitry (e.g. a processor 118 or other event-sequencing circuitry) configured to obtain one or more instructions 127 that cause a first graph 115 to be configured that represents one or more computations 117 117 as one or more computation nodes 380 and (one or more respective instances of) data 201-206, 301-306, 401-406, 501-506, 601-606, 701-706, 801-806, 901-906, 1001-1006, 1101-1106, 1201-1206 as one or more (populated or other) data nodes 380;

transistor-based circuitry (e.g. by other event-sequencing circuitry) configured to identify a first computation node of said one or more computation nodes that represents a corresponding one of the one or more computations 117 that is ready to be performed;

transistor-based circuitry (e.g. by other event-sequencing circuitry) configured to populate a first data node of the data nodes that references said first computation node by causing a first computation that corresponds to said first computation node to be performed (immediately or otherwise) in response to said identifying wherein said populating said first data node includes causing a reference 1090 to said first computation node to become removed;

transistor-based circuitry (e.g. by other event-sequencing circuitry) configured to perform at least some garbage collection upon said first computation node; and transistor-based circuitry (e.g. by other event-sequencing circuitry) configured to mitigate redundant processing in response to one or more invoked instructions of a first node or subgraph component by comparing said first node or subgraph component with a (prior or other) second node or subgraph component and (recovering, extracting, distilling, or otherwise) obtaining a (preexisting, stored, distillation, precursor, confirmation, or other) result of said second node or subgraph component in lieu of regenerating said result of said second node or subgraph component.

Clause 17. The system of any of the above system clauses comprising:

a plurality of computing devices (e.g. comprising one or more client devices 120 or other external devices 130) that are configured to identify and recover intermediate computations 117 and data that are subgraphs in said first graph wherein a graph database includes said first graph.

Clause 18. The system of any of the above system clauses comprising:

a plurality of computing devices that are configured to identify computations 117 in a first graph of operation that are at least partially executed in a second graph of operation and to identify data that are associated with the identified computations 117 and present in the second graph of operation.

Clause 19. The system of any of the above system clauses having recovery and deduplication policies and comprising:

one or more controller devices configured to perform a list of operations in accordance with said recovery and deduplication policies of said system.

Clause 20. The system of any of the above system clauses comprising:

a first client device configured to load data that initializes a configuration of said first graph.

Clause 21. The system of any of the above system clauses comprising:

a first user interface configured to translate one or more user inputs from a first user into a database state related to said one or more instructions and to translate the database state into visual feedback to the first user.

Clause 22. The system of any of the above system clauses wherein said one or more computations 117 include first and second types of resources, a total number of resources to be created, and a pre-assigned input value.

Clause 23. The system of any of the above system clauses comprising a memory-resident application program interface (API) configured to dynamically manipulate a database state of the system, to translate user instructions and data into said computation and data nodes, and to invoke one or more external units to perform at least some of said one or more computations 117.

Clause 24. The system of any of the above system clauses configured to establish most or all numbered features of a pipeline 300 as shown in FIG. 3.

Clause 25. The system of any of the above system clauses configured to establish most or all numbered features of a pipeline 400 as shown in FIG. 4.

Clause 26. The system of any of the above system clauses configured to establish most or all numbered features of a pipeline 500 as shown in FIG. 5.

Clause 27. The system of any of the above system clauses configured to establish most or all numbered features of a pipeline 600 as shown in FIG. 6.

Clause 28. The system of any of the above system clauses configured to establish most or all numbered features of a pipeline 700 as shown in FIG. 7.

Clause 29. The system of any of the above system clauses configured to establish most or all numbered features of a pipeline 800 as shown in FIG. 8.

Clause 30. The system of any of the above system clauses configured to establish most or all numbered features of a pipeline 900 as shown in FIG. 9.

Clause 31. The system of any of the above system clauses configured to establish most or all numbered features of a pipeline 1000 as shown in FIG. 10.

Clause 32. The system of any of the above system clauses configured to establish most or all numbered features of a pipeline 1100 as shown in FIG. 11.

Clause 33. The system of any of the above system clauses configured to establish most or all numbered features of a pipeline 1200 as shown in FIG. 12.

Clause 34. The system of any of the above system clauses and configured to perform a method of any one of the above method clauses.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

What is claimed is:

1. A device-implemented method for optimized computation and data management comprising:

invoking first transistor-based circuitry configured to obtain one or more user instructions that cause a first graph state to be configured that represents one or more computations as one or more computation nodes and data as one or more data nodes;

invoking second transistor-based circuitry configured to identify a first computation node of said one or more computation nodes that represents a corresponding one of the one or more computations that is ready to be performed at least by virtue of all input thereof being populated;

invoking third transistor-based circuitry configured to populate a first data node of the one or more data nodes that references said first computation node by causing a first computation that corresponds to said first computation node to be performed immediately in response to said identifying wherein said populating said first data node includes causing a reference to said first computation node to become removed so that said first computation node is not referenced by the first data node;

invoking fourth transistor-based circuitry configured to perform at least some garbage collection upon said first computation node and all input thereof based on detecting that said first computation node is no longer referenced by providing effective cancellation of running calculations that are no longer represented by existing computation nodes in the first graph state so as to configure a new version of the first graph state that includes already running calculations that are needed and so that one or more running calculations that are not in the new version are interrupted, and protecting said first data node that references said first computation node from being removed so as to ensure that said first computation node temporarily remains available for reuse for a specified period of time even without being referenced by any other node so as to eliminate a need to re-run one or more computations represented in said first computation node and thereafter removing said first computation node as a component of said garbage collection; and automatically applying one or more node lifecycle rules by invoking fifth transistor-based circuitry configured to mitigate redundant processing in response to one or more invoked instructions of a first component of a subgraph or of a node by comparing said first component with a prior second component and obtaining a preexisting or other result of said prior second component in lieu of regenerating said result of said prior second component wherein the one or more node lifecycle rules are applied by (1) dynamically manipulating a database state of a system that includes the first computation node and (2) translating said one or more user instructions and data into said one or more computation nodes and said data and (3) causing one or more external units to perform said corresponding one of said one or more computations that is ready to be performed.

2. The device-implemented method of claim 1 wherein obtaining said one or more user instructions that cause said first graph state to be configured that represents said one or more computations as said one or more computation nodes and data as one or more populated data nodes.

3. The device-implemented method of claim 1 wherein obtaining said one or more user instructions that cause said first graph state to be configured that represents said one or more computations as said one or more computation nodes and data as the one or more data nodes and wherein first and second types of resources, a topology of resource interlinks therebetween, and one or more pre-assigned input values are included in said one or more user instructions that cause said first graph state to be configured.

4. The device-implemented method of claim 1 comprising:

mitigating said redundant processing in said response to said one or more invoked instructions of said first component wherein said mitigating comprises:

detecting one or more operations in a later code sequence instance that produce a same outcome as a corresponding one or more operations in a prior code sequence instance;

marking the one or more operations in the later code sequence instance as a duplicate;

applying the corresponding one or more operations in the later code sequence instance to the prior code sequence instance; and terminating the later code sequence instance.

5. The device-implemented method of claim 1 wherein said obtaining said result of said prior second component comprises:

extracting intermediate computations and data that are isomorphic subgraphs rooted in a graph database.

6. The device-implemented method of claim 1 comprising:

identifying said one or more computations represented in said first graph state that are at least partially executed in a second graph state pursuant to one or more result recovery policies; and identifying data associated with the identified one or more computations also pursuant to said one or more result recovery policies.

7. The device-implemented method of claim 1 comprising:

identifying said one or more computations represented in said first graph state that are at least partially executed in a second graph state pursuant to one or more result recovery policies;

identifying data associated with the one or more identified computations also pursuant to said one or more result recovery policies; and providing both the one or more identified computations that are at least partially executed in the second graph state and the identified data associated with the one or more identified computations without contemporaneously triggering execution of the one or more identified computations in said first graph state.

8. The device-implemented method of claim 1 wherein said automatically mitigating said redundant processing in said response to said one or more invoked instructions of said first component by comparing a fingerprint of said first component with a fingerprint of said second component comprises:

automatically aborting an invocation of said first component.

9. The device-implemented method of claim 1 wherein said automatically mitigating said redundant processing in said response to said one or more invoked instructions of said first component by comparing a fingerprint of said first component with a fingerprint of said second component comprises:

automatically blocking or preventing an invocation of said first component.

10. The device-implemented method of claim 1 comprising:

performing dynamic garbage collection of the one or more data nodes in response to determining that these data nodes are not referenced by any inputs of said one or more computation nodes.

11. The device-implemented method of claim 1 wherein said automatically applying one or more node lifecycle rules comprises:

applying one or more node lifecycle rules that are configured so that the state of any node can change only in one direction.

12. The device-implemented method of claim 1 wherein said providing effective cancellation of running calculations that are no longer represented by existing computation nodes in the computation graph comprises:

causing a real-time cancellation of running calculations that are no longer represented by existing computation nodes in the computation graph.

13. A computer program product for optimized computation and data management comprising:

one or more tangible non-transitory computer-readable storage media; and machine instructions borne on said one or more tangible non-transitory computer-readable storage media which, when running on one or more computer systems, cause said one or more computer systems to perform device-implemented method for optimized computation and data management comprising:

invoking first transistor-based circuitry configured to obtain one or more user instructions that cause a first graph state to be configured that represents one or more computations as one or more computation nodes and data as one or more data nodes;

invoking second transistor-based circuitry configured to identify a first computation node of said one or more computation nodes that represents a corresponding one of the one or more computations that is ready to be performed at least by virtue of all input thereof being populated;

invoking third transistor-based circuitry configured to populate a first data node of the one or more data nodes that references said first computation node by causing a first computation that corresponds to said first computation node to be performed immediately in response to said identifying wherein said populating said first data node includes causing a reference to said first computation node to become removed so that said first computation node is not referenced by the first data node;

invoking fourth transistor-based circuitry configured to perform at least some garbage collection upon said first computation node and all input thereof based on detecting that said first computation node is no longer referenced by providing effective cancellation of running calculations that are no longer represented by existing computation nodes in the first graph state so as to configure a new version of the first graph state that includes already running calculations that are needed and so that one or more running calculations that are not in the new version are interrupted, and protecting said first data node that references said first computation node from being removed so as to ensure that said first computation node temporarily remains available for reuse for a specified period of time even without being referenced by any other node so as to eliminate a need to re-run one or more computations represented in said first computation node and thereafter removing said first computation node as a component of said garbage collection; and automatically applying one or more node lifecycle rules by invoking fifth transistor-based circuitry configured to mitigate redundant processing in response to one or more invoked instructions of a first component of a subgraph or of a node by comparing said first component with a prior second component and obtaining a preexisting or other result of said prior second component in lieu of regenerating said result of said prior second component wherein the one or more node lifecycle rules are applied by (1) dynamically manipulating a database state of a system that includes the first computation node and (2) translating said one or more user instructions and data into said one or more computation nodes and said data and (3) causing one or more external units to perform said corresponding one of said one or more computations that is ready to be performed.

14. A device-implemented system for optimized computation and data management comprising:

first transistor-based circuitry configured to obtain one or more user instructions that cause a first graph state to be configured that represents one or more computations as one or more computation nodes and data as one or more data nodes;

second transistor-based circuitry configured to identify a first computation node of said one or more computation nodes that represents a corresponding one of the one or more computations that is ready to be performed at least by virtue of all input thereof being populated;

third transistor-based circuitry configured to populate a first data node of the one or more data nodes that references said first computation node by causing a first computation that corresponds to said first computation node to be performed immediately in response to said identifying wherein said populating said first data node includes causing a reference to said first computation node to become removed so that said first computation node is not referenced by the first data node;

fourth transistor-based circuitry configured to perform at least some garbage collection upon said first computation node and all input thereof based on detecting that said first computation node is no longer referenced by providing effective cancellation of running calculations that are no longer represented by existing computation nodes in the first graph state so as to configure a new version of the first graph state that includes already running calculations that are needed and so that one or more running calculations that are not in the new version are interrupted, and protecting said first data node that references said first computation node from being removed so as to ensure that said first computation node temporarily remains available for reuse for a specified period of time even without being referenced by any other node so as to eliminate a need to re-run one or more computations represented in said first computation node and thereafter removing said first computation node as a component of said garbage collection; and fifth transistor-based circuitry configured to apply one or more node lifecycle rules automatically by mitigating redundant processing in response to one or more invoked instructions of a first component of a subgraph or of a node by comparing said first component with a prior second component and obtaining a preexisting or other result of said prior second component in lieu of regenerating said result of said prior second component wherein the one or more node lifecycle rules are applied by (1) dynamically manipulating a database state of a system that includes the first computation node and (2) translating said one or more user instructions and data into said one or more computation nodes and said data and (3) causing one or more external units to perform said corresponding one of said one or more computations that is ready to be performed.

15. The device-implemented system of claim 14 comprising:

a plurality of computing devices including one or more processors that are configured to identify and recover intermediate computations and data that are subgraphs in said first graph state wherein a graph database includes said first graph state; and a memory-resident application program interface (API) configured to dynamically manipulate a database state of the system, to translate one or more user instructions and data into said one or more computations and said one or more data nodes, and to invoke one or more external units to perform at least some of said one or more computations.

16. The device-implemented system of claim 14 comprising:

a plurality of computing devices including one or more processors that are configured to identify one or more computations represented in said first graph state that are at least partially executed in a second graph state and to identify data that are associated with the one or more identified computations represent in the second graph state.

17. The device-implemented system of claim 14 having recovery and deduplication policies and comprising:

one or more controller devices including one or more processors configured to perform a list of operations in accordance with said recovery and deduplication policies of said system; and a first client device including one or more processors configured to load data that initializes a configuration of said first graph state.

18. The device-implemented system of claim 14 comprising:

a first hardware implemented user interface configured to translate one or more user inputs from a first user into a database state related to said one or more instructions and to translate the database state into visual feedback to the first user wherein said one or more computations include first and second types of resources, a total number of resources to be created, and a pre-assigned input value.

* * * * *